United States Patent
Livescu

(10) Patent No.: US 11,520,313 B1
(45) Date of Patent: Dec. 6, 2022

(54) GEOTHERMAL WELL CONSTRUCTION FOR HEATING AND COOLING OPERATIONS

(71) Applicant: Bedrock Energy, Inc., Los Angeles, CA (US)

(72) Inventor: Silviu Livescu, Austin, TX (US)

(73) Assignee: Bedrock Energy, Inc., Los Angeles, CA (US)

(*) Notice: Subject to any disclaimer, the term of this patent is extended or adjusted under 35 U.S.C. 154(b) by 0 days.

(21) Appl. No.: 17/835,905

(22) Filed: Jun. 8, 2022

(51) Int. Cl.
G05B 19/4155 (2006.01)

(52) U.S. Cl.
CPC ........ *G05B 19/4155* (2013.01); *G05B 2219/45129* (2013.01); *G05B 2219/50333* (2013.01)

(58) Field of Classification Search
CPC .................................................. G05B 19/4155
See application file for complete search history.

(56) References Cited

U.S. PATENT DOCUMENTS

| | | | | |
|---|---|---|---|---|
| 6,021,377 | A * | 2/2000 | Dubinsky | ........... E21B 44/00 |
| | | | | 702/9 |
| 9,631,478 | B2 | 4/2017 | Livescu et al. | |
| 10,280,729 | B2 | 5/2019 | Livescu et al. | |
| 10,815,774 | B2 | 10/2020 | Livescu et al. | |
| 10,822,942 | B2 | 11/2020 | Livescu et al. | |
| 10,844,707 | B2 | 11/2020 | Garner et al. | |
| 10,995,563 | B2 | 5/2021 | SøE et al. | |
| 2015/0260015 | A1* | 9/2015 | Ludvigsen | ...... G06Q 10/06313 |
| | | | | 175/57 |
| 2015/0322766 | A1* | 11/2015 | Veltman | ........... E21B 44/00 |
| | | | | 340/853.6 |
| 2018/0371889 | A1* | 12/2018 | Hohl | ............... E21B 47/12 |
| 2019/0137134 | A1* | 5/2019 | Koop | ............... G06F 30/20 |
| 2020/0355839 | A1* | 11/2020 | Jeong | ............... G01V 1/50 |
| 2022/0188712 | A1* | 6/2022 | Mittal | ............... E21B 47/12 |

FOREIGN PATENT DOCUMENTS

CN 104453848 B * 6/2019 ............. E21B 41/00

OTHER PUBLICATIONS

Pastorek et al., "Downhole Sensors in Drilling Operations," Proceedings, 44th Workshop on Geothermal Reservoir Engineering, Stanford University, Stanford, California, Feb. 11-13, 2019, 9 pgs.

* cited by examiner

*Primary Examiner* — Vincent H Tran
(74) *Attorney, Agent, or Firm* — Morgan, Lewis & Bockius LLP

(57) ABSTRACT

A system for optimizing a geothermal heating and cooling system operation comprises a drill rig and a processor. The drill rig is configured to construct a geothermal borehole according to operational parameters and deploy a coiled tubing or joint drill pipes enabled drill bit. The processor is configured to receive user specification of (i) one or input parameters and (ii) a first coefficient of performance (COP) of a heat pump for constructing the geothermal borehole. The processor is configured to apply a model to determine the set of operational parameters for constructing the first geothermal borehole. The processor is configured to collect, in real time during the construction, sensor data from sensors positioned on the drill bit, update the model according to the sensor data, update the operational parameters according to the updated model, and control the construction of the first geothermal borehole according to the updated operational parameters.

20 Claims, 16 Drawing Sheets

|  | Surface Data | Downhole data |
|---|---|---|
| Mud Data | Pit volume<br>Mud temperature<br>Mud pressure<br>Mud weight<br>Pump strokes | N/A |
| Well Data | Temperature<br>Pressure<br>Gas measurements | Temperature<br>Pressure |
| Directional Data |  | Inclination<br>Azimuth |
| Drilling Mechanics | RPM<br>Weight on bit<br>Torque<br>Bending moment<br>Rotary torque<br>Hook load<br>Rate of penetration | RPM<br>Weight on bit<br>Torque on bit<br>Bending moment<br>Downhole vibration |
| Geological data | Cutting analysis | Density<br>Porosity<br>Resistivity<br>Gamma |

Figure 6

GEOTHERMAL WELL CONSTRUCTION FOR HEATING AND COOLING OPERATIONS

TECHNICAL FIELD

The disclosed implementations relate generally to geothermal heating and cooling systems, and more specifically to systems, methods, and devices for planning, constructing, and optimizing geothermal wells for geothermal heating and cooling system operations.

BACKGROUND

Geothermal energy is a renewable resource that harnesses the Earth's heat. Just a few feet below the surface, the Earth maintains a near-constant temperature, in contrast to the summer and winter extremes of the ambient air above ground.

Installing a geothermal heating and cooling system (GHCS) (also referred herein as a geothermal system) generally involves drilling one or more geothermal wells (e.g., geothermal boreholes) horizontally or vertically, depending on the characteristics of the site. A looped pipe is constructed from the geothermal wells, and heat is transferred between the building (e.g., a residential or commercial building) and the earth using fluid circulated through the looped pipes.

SUMMARY

Current GHCS installations have several drawbacks. First, these installations generally do not take into account surface or subsurface conditions of the site in which the geothermal system would be installed. Instead, standard-sized geothermal wells (e.g., geothermal boreholes) are usually constructed, with depths, lengths, and spacings that are pre-determined based on prior rule-of-thumb experience of the drillers. Second, current residential geothermal systems tend to have fairly shallow well depths (e.g., around 20 feet deep for horizontal geothermal loops) with a large amount of pipes buried horizontally. For example, a typical 2,000-square-foot home uses around 1,500 to 1,800 feet of pipes. Larger buildings, such as industrial, commercial or multi-story residential, would require impractical lengths of horizontal pipes.

Drilling geothermal wells without proper planning and engineering design can lead to non-optimal performance of the geothermal systems, both short-term and in the long run. This directly translates into higher operating costs and unreliable heating and cooling systems for the building owners. Furthermore, the current installation model for residential geothermal systems, which utilizes shallow geothermal wells and large horizontal areas, is not scalable for buildings that are bigger in size (e.g., commercial buildings), have higher energy loads, and/or are located in areas of higher density. For example, a commercial building located in a city may require multiple deep geothermal boreholes, constructed vertically, to be drilled for a geothermal system to properly work.

Accordingly, there is a need for improved systems, methods, and devices that enable design and execution of a GHCS operation. The present disclosure describes an improved system and method for planning and performing a GHCS construction operation, which combines data modeling, hardware components, and an integrated workflow that can be used pre-operation, during the operation, and post-operation. This combination of features differentiates from existing systems for decarbonizing the commercial, industrial, and large residential building sector and for assuring confidence and consistent predictability in the long-term optimum performance of GHCS.

The systems, methods, and devices of this disclosure each have several innovative aspects, no single one of which is solely responsible for the desirable attributes disclosed herein.

In accordance with some implementations of the present disclosure, a method for optimizing a GHCS operation comprises receiving user specification of (i) one or more input parameters and (ii) a first coefficient of performance (COP) of a heat pump for constructing a first geothermal borehole. The method comprises, based on at least a subset of the input parameters and the first COP, applying a model to determine a set of operational parameters for constructing the first geothermal borehole. The method comprises constructing the first geothermal borehole according to the set of operational parameters, including: deploying a coiled tubing (CT) or joint drill pipe enabled drill bit; collecting, in real time during the constructing, sensor data from a plurality of sensors positioned on the drill bit; updating the model according to the sensor data; updating the operational parameters according to the updated model; and controlling the construction of the first geothermal borehole according to the updated operational parameters.

In some implementations, updating the model according to the sensor data includes computing a second COP of the heat pump based on the sensor data; and updating the model according to the second COP.

In some implementations, updating the operational parameters includes updating one or more of: a drilling depth, a drilling diameter; and/or a drilling direction.

In some implementations, the plurality of sensors are positioned on both an interior surface and an exterior surface of the drill bit.

In some implementations, the plurality of sensors include two sensors having a same type, wherein one of the two sensors is positioned on the interior surface of the drill bit and the other of the two sensors is positioned on the exterior surface of the drill bit.

In some implementations, the plurality of sensors measures a plurality of: pressure, temperature, fluid flow, and/or directional data.

In some implementations, applying the model to determine the set of operational parameters includes: generating a range of borehole temperatures and/or borehole sizes based on the at least a subset of the plurality of input parameters and the first COP; and determining the set of operational parameters based on the range of borehole temperatures and/or borehole sizes.

In some implementations, the range of borehole temperatures and/or borehole sizes are generated according to a range of COP values based on the first COP.

In some implementations, the one or more input parameters include a first input parameter specifying a span of time for calculating a long-term COP. Applying the model to determine the set of operational parameters includes computing an aggregated COP of the heat pump over the span of time; and generating a range of borehole temperatures and/or borehole sizes according to the aggregated COP.

In some implementations, the method further comprises repeating the steps of collecting sensor data, updating the model, and updating the operational parameters during the construction of the first geothermal borehole.

In some implementations, the model is stored locally on a computing device that is co-located with the construction of the first geothermal borehole.

In some implementations, the model is stored on a remote server. Updating the model according to the sensor data includes transmitting the sensor data from a computing device, co-located with the construction of the first geothermal borehole, to the remote server, wherein the server is configured to update the model according to the sensor data.

In some implementations, the method further comprises, after constructing the first geothermal borehole, computing a second COP of the heat pump according to at least one of: (i) an inlet temperature and an outlet temperature or (ii) a measured bottom hole temperature of a geothermal loop constructed based on the first geothermal borehole. The method comprises comparing the second COP with a predicted COP. The method comprises, in accordance with a determination that the second COP does not match the predicted COP, adjusting a flow rate of a working fluid of the geothermal loop. The method comprises, in accordance with a determination that the second COP matches the predicted COP, maintaining the flow rate of the working fluid of the geothermal loop.

In some implementations, the method further comprises continuously adjusting the flow rate of the working fluid based on daily temperature fluctuations.

In some implementations, the method further comprises periodically adjusting the flow rate of the working fluid based on seasonal temperature fluctuations.

In some implementations, the method further comprises adjusting the flow rate of the working fluid based on an energy load of the geothermal loop.

In some implementations, the method further comprises repeating the steps of computing and comparing at a predefined time interval.

In some implementations, the geothermal loop is a geothermal loop is used for heating and cooling a building. The method further comprises reversing a heat transfer direction in the building according to a predefined time interval. In some implementations, the method also comprises repeating the steps of computing and comparing in accordance with the reversed heat transfer direction.

In accordance with some implementations of the present disclosure, a system for optimizing a GHCS operation comprises a drilling rig and a processor. The drilling rig is configured to construct a first geothermal borehole according to a set of operational parameters and deploy a CT or joint drill pipes enabled drill bit. The drill bit includes downhole telemetry and is configured to measure downhole conditions in real time. The processor is configured to receive user specification of (i) one or input parameters and (ii) a first coefficient of performance (COP) of a heat pump for constructing the first geothermal borehole. The processor is configured to, based on at least a subset of the input parameters and the first COP, apply a model to determine the set of operational parameters for constructing the first geothermal borehole. The processor is configured to collect, in real time during the construction, sensor data from a plurality of sensors positioned on the drill bit. The processor is configured to update the model according to the sensor data. The processor is configured to update the operational parameters according to the updated model. The processor is configured to control the construction of the first geothermal borehole according to the updated operational parameters.

In accordance with some implementations, a computing device includes one or more processors, memory, and one or more programs stored in the memory. The programs are configured for execution by the one or more processors. The one or more programs include instructions for performing any of the methods described herein.

In accordance with some implementations, a non-transitory computer-readable storage medium stores one or more programs configured for execution by a computing device having one or more processors and memory. The one or more programs include instructions for performing any of the methods described herein.

Thus methods, systems, and devices are disclosed that enable optimal design, execution, and performance of GHCS operations.

Note that the various implementations described above can be combined with any other implementations described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

FIG. 6 illustrates exemplary types of surface data and downhole data that are collected by sensors in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Some methods, devices, and systems disclosed in the present specification improve upon geothermal heating and cooling system (GHCS) operations by providing an integrated workflow that combines data modeling, hardware components, and a workflow for planning, executing, and/or optimizing a GHCS installation operation.

In accordance with some aspects of the present disclosure, the GHCS operation includes drilling one or more geothermal wells (e.g., boreholes). GHCS drilling employ various technologies and methods to drill and construct geothermal boreholes in urban, suburban, and rural areas. Methods of drilling geothermal boreholes include joint pipe drilling and CT drilling. Performing an optimal geothermal drilling operation involves modeling design before the operation, using downhole parameters such as a borehole size and length, mechanical friction forces, tensile forces, pumping rates, soil and rock properties, pressure and/or temperature. Some aspects of the present disclosure describe using surface and subsurface (e.g., underground) sensors for acquiring data such as pressure, temperature, depth correlation and azimuth, rock hardness, pumping rates, etc., for adjusting the pre-operation design in real time while drilling. Some aspects of the present disclosure describe using the same model after the GHCS drilling and construction operation is finished, to monitor the geothermal loop inlet and outlet temperature and enthalpy, the indoor temperature, and/or the coefficient of performance of the heat pump in real time, and to adjust the pump rate to maintain an optimal heating and cooling performance.

Figure 1:
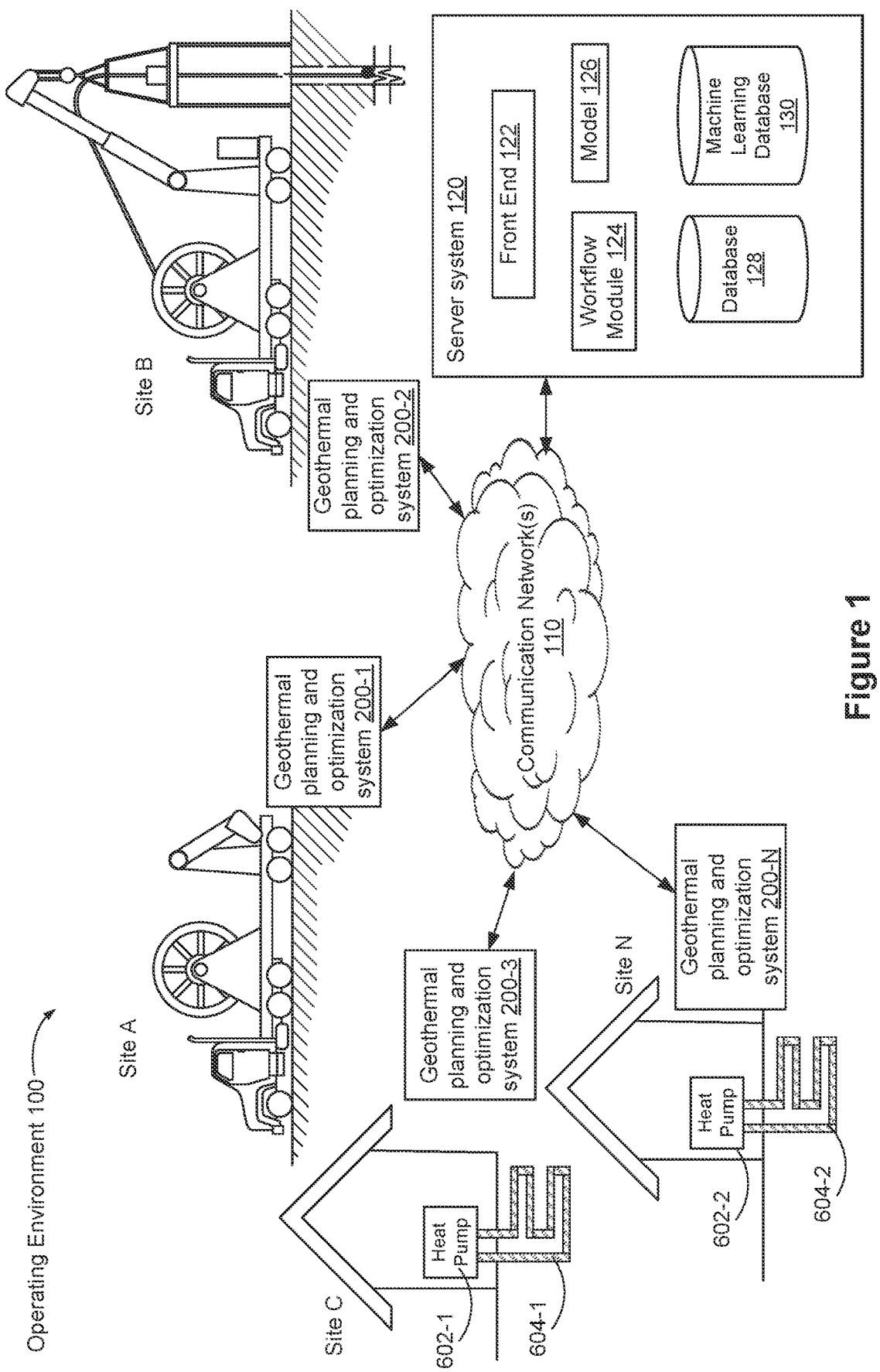
FIG. 1 illustrates an operating environment in accordance with some implementations.

FIG. 1 illustrates an operating environment 100 in accordance with some implementations. In some implementations, the operating environment 100 includes one or more geothermal planning and optimization systems 200 (e.g., a computer system a computing device, or an electronic device,). In the example of FIG. 1, each of the systems 200-1, 200-2, 200-3, and 200-N is located at a respective (e.g., distinct) site (e.g., Site A, Site B, Site C, Site N), corresponding to a respective (e.g., distinct) city, state, or country.

In some implementations, each of the geothermal planning and optimization systems 200 is configured to be operable at various phases (e.g., all phases, all stages, or a subset thereof) of a GHCS operation. The phases can include a pre-construction phase, a construction phase, and a post-construction phase. For example, in FIG. 1, the geothermal planning and optimization system 200-1 located in Site A corresponds to the pre-construction phase. The system 200-2 located in Site B corresponds to the construction phase. The systems 200-3 and 200-N, in Site C and Site N respectively, correspond to the post-construction phase.

In some implementations, the geothermal planning and optimization system 200 is communicatively coupled through communication network(s) 110 to a server system 120.

In some implementations, the server system 120 includes a front end server 122 that facilitates communication between the server system 120 and the geothermal planning and optimization system 200. The front end server 122 is configured to receive information from the geothermal planning and optimization system 200. For example, during the planning (e.g., pre-construction) phase for a geothermal borehole construction project at Site A, the front end server 122 can receive (e.g., in real-time), from the geothermal planning and optimization system 200-1, information such as building size, site information, and/or data regarding rock type found at Site A. As another example, during the construction of a geothermal borehole at Site B, the front end server 122 can receive (e.g., in real-time) from the geothermal planning and optimization system 200-2 information such as sensor data collected by one or more sensors of a drilling rig that is performing the borehole construction at Site B. As another example, the front end server 122 can receive (e.g., in real-time) from the geothermal planning and optimization system 200-3 information such as a fluid flow rate and/or a heat pump coefficient of performance (COP) or energy efficiency ratio (EER), corresponding to a geothermal loop 604-1 at Site C.

In some implementations, the front end server 122 is configured to send information to the one or more geothermal planning and optimization systems 200. For example, the front end server 122 can send operational parameters (e.g., drilling depth, diameter, and/or direction) to the geothermal planning and optimization system 200-1, to facilitate drilling of the geothermal borehole at Site A. As another example, in response to receiving the sensor data from the geothermal planning and optimization system 200-2, the front end server 122 can send updated operational parameters to the geothermal planning and optimization system 200-2, to control (e.g., optimize) the dimensions of the geothermal borehole that is being constructed art Site B. As another example, in response to receiving data associated with the geothermal loop 604-1, the front end server 122 can send to the geothermal planning and optimization system 200-3 information such as a desired flow rate for the working fluid, so as to optimize the operation of the geothermal loop 604-1.

In some implementations, the server system 120 includes a workflow module 124 for providing an integrated workflow 628 corresponding a geothermal heating and cooling system operation. Details of the workflow module 124 are discussed in FIGS. 2, 3, and 8.

In some implementations, the server system 120 includes a model 126 (e.g., a physics-based model, a mathematical-based model, a data-driven model, a machine learning algorithm) for modeling the heating and cooling loads of the building, the heat pump, and the GHCS well (e.g., geothermal borehole(s)) sizes and lengths. Details of the model 126 are discussed in FIGS. 2 and 3.

In some implementations, the server system 120 includes a database 128. Details of the database 128 are further described in FIG. 3.

In some implementations, the server system 120 includes a machine learning database 130 that stores machine learning information. In some implementations, the machine learning database 130 is a distributed database. In some implementations, the machine learning database 130 includes a deep neural network database. In some implementations, the machine learning database 130 includes supervised training and/or reinforcement training databases.

Figure 2:
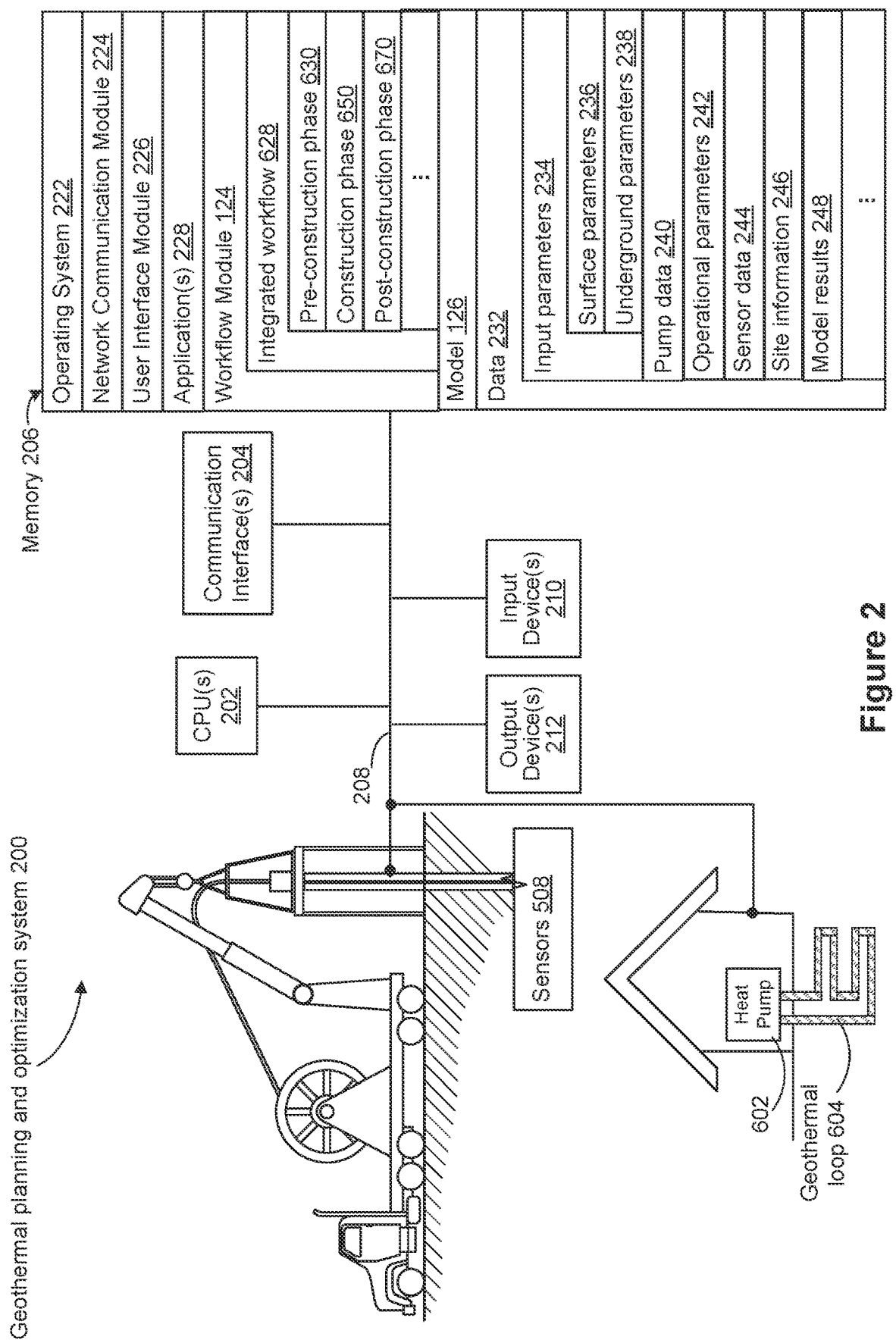
FIG. 2 illustrates a block diagram of a geothermal planning and optimization system according to some implementations.

FIG. 2 illustrates a block diagram of a geothermal planning and optimization system 200 according to some implementations.

The system 200 typically includes one or more processors (e.g., processing units, or CPUs) 202, one or more network or other communication interfaces 204, memory 206, and one or more communication buses 208 for interconnecting these components. In some implementations, the communication buses 208 include circuitry (sometimes called a chipset) that interconnects and controls communications between system components.

In some implementations, the system 200 is communicatively connected to one or more sensors 508 that are positioned on a drill bit 502 of a CT 408 and/or a joint pipe 422, the details of which are described in FIGS. 4, 5, and 6.

In some implementations, the system 200 is communicatively connected to one or more heat pumps 602 that are operably coupled to one or more respective geothermal loops 604. Details of the heat pump 602 and the geothermal loop are described in FIG. 7.

The system 200 includes one or more input devices 210 that facilitate user input, such as a keyboard, a mouse, a voice-command input unit or microphone, a touch screen display, a touch-sensitive input pad, a gesture capturing camera, or other input buttons or controls. In some implementations, the system 200 includes one or more cameras or scanners for capturing data. The system 200 also includes one or more output devices 212 that enable presentation of user interfaces and display content, including one or more speakers and/or one or more visual displays.

In some implementations, the memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. In some implementations, the memory 206 includes one or more storage devices remotely located from one or more processing units 202. The memory 206, or alternatively the non-volatile memory device(s) within the memory 206, includes a non-transitory computer-readable storage medium. In some implementations, the memory 206 or the computer-readable storage medium of the memory 206 stores the following programs, modules, and data structures, or a subset or superset thereof:

- Operating system 222 including procedures for handling various basic system services and for performing hardware dependent tasks;
- a communications module 224, which is used for connecting the system 200 to other systems, computers and devices via the one or more communication interfaces 204 (wired or wireless), such as the communication network(s) 100, Internet, other wide area networks, local area networks, metropolitan area networks, and so on;
- User interface module 226 for enabling presentation of information (e.g., a graphical user interface for application(s) 228, widgets, websites and web pages thereof, and/or audio and/or video content, text, etc.) at the system 200 via one or more output devices 212 (e.g., displays, speakers, etc.);
- One or more user applications 228 for execution by the system 200 (e.g., web or non-web based applications for controlling another system, electronic device, or sensors, or for reviewing data captured by such devices);
- a workflow module 124 for providing an integrated workflow 628 corresponding a GHCS operation;
- a model 126 for modeling the heating and cooling loads of the building, the heat pump, and the GHCS well (e.g., geothermal borehole(s)) sizes and lengths); and
- data 232 including:
  - input parameters 234. In some implementations, the input parameters 234 include surface parameters 236. The surface parameters 326 include: building size, building type (e.g., wall material and insulation; roof type; number, size, and orientation of windows; ventilation system; etc.), location, outdoor temperature, heat pump size, heat pump type, and/or inlet/outlet temperatures of the geothermal loop. In some implementations, the input parameters 234 include underground parameters 238. The underground parameters 238 include: fluid type (e.g., density and/or viscosity, and thermal conductivity), geothermal loop roughness, inlet temperatures of the geothermal loop(s), geothermal loop length and/or depth, size (e.g., diameter), and trajectory (e.g., vertical, horizontal, inclined, and/or deviated), geothermal loop material/heat transfer coefficient, soil and/or rock type and properties, aquifer depth and height, grout/cement/casing heat transfer coefficients, and geothermal working fluid flow rate
  - pump data 240, including manufacturer heat pump COP and/or EER and/or calculated heat pump COP and/or EER (e.g., during borehole construction or during operation of a geothermal loop);
  - Operational parameters 242, including drilling depth(s), drilling diameter(s), and/or drilling direction(s);
  - Sensor data 244. In some implementations, the sensor data 244 are collected automatically and/or in real time. In some implementations, the sensor data 244 are collected directly (e.g., by sensors 508 or sensors 510) or by indirect measurements. In some implementations, the sensor data 244 includes surface data and/or downhole data, as illustrated in FIG. 6;
  - Site information 246, including geographical location(s) of geothermal borehole(s), rock conditions, heat pump(s), geothermal loop(s) and their inlet and outlet temperatures, working fluid type(s), and/or working fluid flow rates; and
  - model results 248 generated by the model 126.

In some implementations, the integrated workflow 628 includes a combination of one or more workflows, each corresponding to a respective phase of a geothermal heating and cooling operation (e.g., a geothermal project). The integrated workflow 628 can include a combination of: a pre-construction phase workflow 630, a construction phase workflow 650, and a post-construction phase workflow 670. In some implementations, each of the workflows 630, 650, and 670 can be executed as a standalone workflow. Details of the workflows 630, 650, and 670 are discussed in FIGS. 8A to 8C;

In some implementations, the model 126 comprises a physics-based model, a mathematical-based model, a data-driven model, and/or a machine learning algorithm. In some implementations during a pre-construction phase, the model 126 uses data 232, such as input parameter(s) 234, and a heat pump COP or EER 242, to predict (e.g., estimate) a length and/or depth of the borehole(s) to be drilled and/or estimate one or more locations of the boreholes. The model 126 generates operational parameters 242 for constructing a geothermal borehole. In some implementations, during a construction phase, the model 126 uses sensor data 244 (e.g., collected in real time using sensors 508 and/or sensors 510) to further refine and/or optimize the operational parameters 242. In some implementations, during a post-construction phase, the model 126 uses inputs such as a surface air temperature, a building size, and/or a heat pump COP to determine heat exchange parameters at a geothermal loop, and determines an optimized flow rate of the fluid in the geothermal loop.

In some implementations, the model 126 comprises a subsurface fluid transport and heat transfer model. The model 126 allows a user to automatedly engineer an entire subsurface system (e.g., engineer a number, size(s), length(s) of geothermal wells (e.g., boreholes), and the distance between wells) specifically designed for each building.

In some implementations, the model 126 includes a surface sub-model and an underground sub-model. The surface sub-model solves energy balance equations for the building and heat pump(s). For example, the surface sub-model uses a subset of the surface parameters 236 and generates, as outputs, a heat pump efficiency and a geothermal working fluid flow rate. The underground sub-model solves mass, momentum, and energy conservation equations in the geothermal loop(s) and radial diffusivity equation(s) in the underground rocks around the geothermal borehole(s). The underground sub-model uses a subset of the underground parameters 238 and generates (e.g., outputs) an outlet temperature of the geothermal loop. In some implementations, the model 126 couples the surface sub-model and the underground sub-model and solves them together. In this instance, the model 126 uses a subset of the surface parameters 236 and the underground parameters 238 as inputs, and calculates an optimum heat pump efficiency by adjusting the geothermal working fluid flow rate. The unknowns in the model 126 include: underground heat transfer coefficients in the rocks, aquifer, and grout/cement (e.g., the grout/cement thickness may vary along the borehole length). Thus, inlet/outlet temperatures of the geothermal loops and geothermal working fluid flow rates (e.g., site information 246) are measured over time and data sets (e.g., training data training data 326) are built to predict the underground heat transfer coefficients using non-linear least square solvers such as the gradient-based Levenberg-Marquardt algorithm. This, in turn, allows for adjusting the geothermal working fluid flow rates for continuously optimal heat pump efficiencies (e.g., during the day, at night, every day of the year, etc.).

Although FIG. 2 shows a system 200, FIG. 2 is intended more as a functional description of the various features that may be present rather than as a structural schematic of the implementations described herein. In practice, and as recognized by those of ordinary skill in the art, items shown separately could be combined and some items could be separated.

Each of the above identified executable modules, applications, or sets of procedures may be stored in one or more of the memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above (e.g., module(s) for machine learning and/or training models). In some implementations, a subset of the programs, modules, and/or data stored in the memory 206 are stored on and/or executed by the server system 120.

Figure 3:
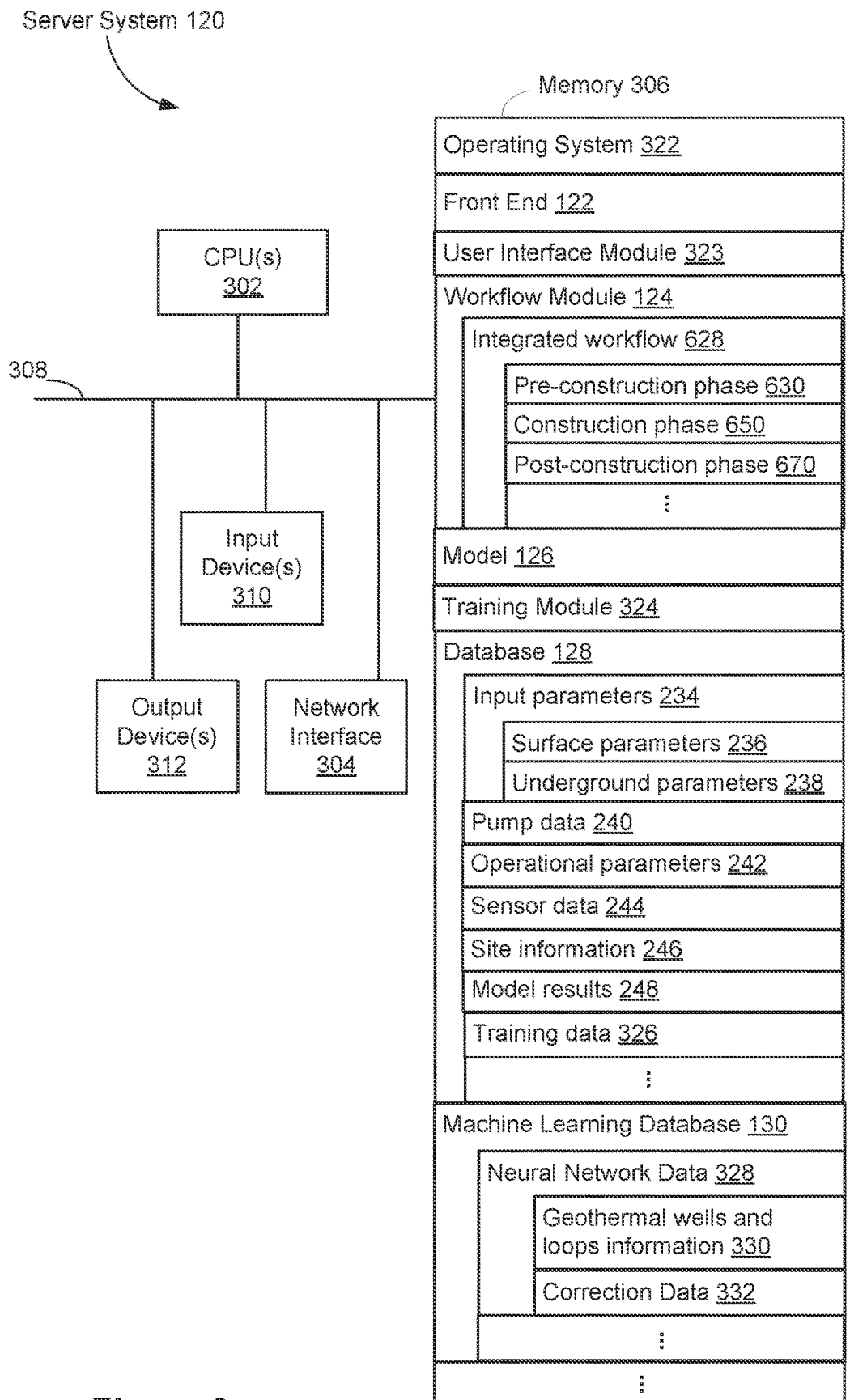
FIG. 3 is a block diagram illustrating a server system, in accordance with some implementations.

FIG. 3 is a block diagram illustrating a server system 120, in accordance with some implementations.

The server system 120 includes one or more processors 302 (e.g., processing units of CPU(s)), one or more network interfaces 304, memory 306, and one or more communication buses 308 for interconnecting these components (sometimes called a chipset), in accordance with some implementations.

The server system 120 optionally includes one or more input devices 310 that facilitate user input, such as a keyboard, a mouse, a voice-command input unit or microphone, a touch screen display, a touch-sensitive input pad, a gesture capturing camera, or other input buttons or controls. In some implementations, the server system 120 optionally uses a microphone and voice recognition or a camera and gesture recognition to supplement or replace the keyboard. The server system 120 optionally includes one or more output devices 312 that enable presentation of user interfaces and display content, such as one or more speakers and/or one or more visual displays.

The memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 306, optionally, includes one or more storage devices remotely located from the one or more processors 302. The memory 306, or alternatively the non-volatile memory within the memory 306, includes a non-transitory computer-readable storage medium. In some implementations, the memory 306, or the non-transitory computer-readable storage medium of the memory 306, stores the following programs, modules, and data structures, or a subset or superset thereof:

- an operating system 322 including procedures for handling various basic system services and for performing hardware dependent tasks;
- a front end 122 for communicatively coupling the server system 120 to other devices and/or systems (e.g., the geothermal planning and optimization systems 200-1, 200-2, 200-3, . . . , 200-N) via the network interface(s) 304 (wired or wireless) and one or more networks, such as communication network(s) 110, the Internet, other wide area networks, local area networks, metropolitan area networks, and so on;
- a user interface module 323 for enabling presentation of information (e.g., a graphical user interface for presenting application(s), widgets, websites and web pages thereof, games, audio and/or video content, text, etc.) either at the server system or at a geothermal planning and optimization system 200 (e.g., a computing device);
- Workflow module 124 for providing an integrated workflow 628 corresponding a GHCS operation. In some implementations, the integrated workflow 628 includes one or more of: a pre-construction phase workflow 630, a construction phase workflow 650, and a post-construction phase workflow 670;
- a model 126;
- a training module 324 for generating and/or training geothermal planning and optimization models (e.g., model 126) for predicting underground heat transfer coefficient(s). In some implementations, the training module 324 uses training data 326 to generate and/or train the models. In some implementations, the training data 326 (e.g., training data sets) are generated from geothermal loop inlet/outlet temperature measurements over time (e.g., one month, six months, one year, five years) and/or geothermal working fluid flow rate measurements over time. In some implementations, the training data 326 are generated from nearby buildings or from buildings with similar thermal energy loads. In some implementations, the training module 324 uses non-linear least square solvers such as the gradient-based Levenberg-Marquardt algorithm, for predicting underground heat transfer coefficient(s) for a GHCS site location. This, in turn, allows for adjusting the geothermal working fluid flow rates for continuously optimal heat pump efficiencies (i.e., during the day, at night—every day of the year);
- a database 128, which store data used, collected, and/or created by the workflow module 124, the model 126, and/or the training module 324. The database 128 may store input parameters 234, including surface parameters 236 and/or underground parameters 238, which provide the data used in the model 126, the integrated workflow 628, and/or the workflows 630, 650, and 670. In some implementations, the database 128 stores pump data 240 of heat pumps that are installed at sites utilizing the system 200. In some implementations, the database 128 stores operational parameters 242 for constructing geothermal borehole(s), including drilling depth(s), drilling diameter(s), and/or drilling direction(s). In some implementations, the database 128 stores sensor data 244 that are collected by surface and/or subsurface sensors (e.g., sensors 508 and/or sensors 510) located at various geothermal sites. In some implementations, the database 128 stores site information 246 of sites equipped with the system 200, including geographical location(s) of geothermal borehole(s), rock conditions, heat pump(s), geothermal loop(s) and their inlet and outlet temperatures, working fluid type(s), and/or working fluid flow rates. In some implementations, the database 128 stores model results 248 generated by the model 126. In some implementations, the database 128 stores training data 326. In some implementations, the database 128 stores the data by site locations. In some implementations, the database 128 stores the data by a respective identifier of the system(s) 200;

In some implementations, the memory 306 includes a machine learning database 130 for storing machine learning information. In some implementations, the machine learning database 130 includes the following datasets or a subset or superset thereof:

neural network data 328 including information corresponding to the operation of one or more neural network(s), including, and not limited to:

geothermal wells and loops information 330 including information (e.g., feature vectors) corresponding to different locations and/or configurations of geothermal wells (e.g., geothermal boreholes) and geothermal loops; and correction data 332 corresponding to the geothermal wells and loops information 330.

In some implementations, the server system 120 includes a device registration module for registering devices (e.g., computer device, system 200, etc.) for use with the server system 120.

In some implementations, the server system 120 includes a notification module (not shown) for generating alerts and/or notifications for users of the geothermal planning and optimization system(s) 200. For example, in some implementations the model 126 (or the workflow module 124) is stored locally on the system 200 of the user, the server system 120 may generate notifications to alert the user to download the latest version(s) or update(s) to the model.

Each of the above identified elements may be stored in one or more of the memory devices described herein, and corresponds to a set of instructions for performing the functions described above. The above identified modules or programs need not be implemented as separate software programs, procedures, modules or data structures, and thus various subsets of these modules may be combined or otherwise re-arranged in various implementations. In some implementations, the memory 306, optionally, stores a subset of the modules and data structures identified above. Furthermore, the memory 306 optionally stores additional modules and data structures not described above. In some implementations, a subset of the programs, modules, and/or data stored in the memory 306 are stored on and/or executed by the geothermal planning and optimization system 200.

Figure 4A:
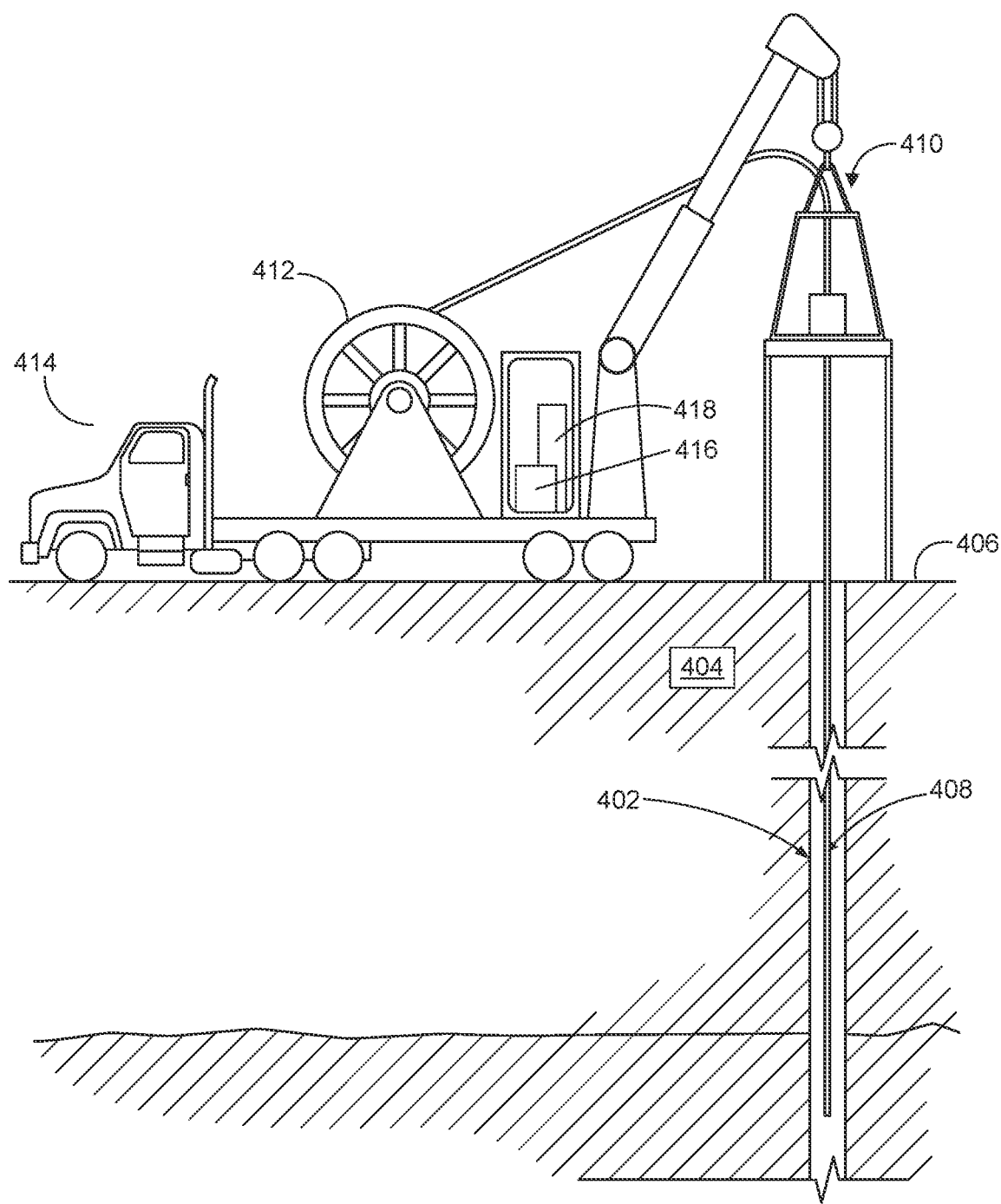
FIGS. 4A and 4B illustrate drilling of a geothermal borehole in accordance with some implementations.
Figure 4B:
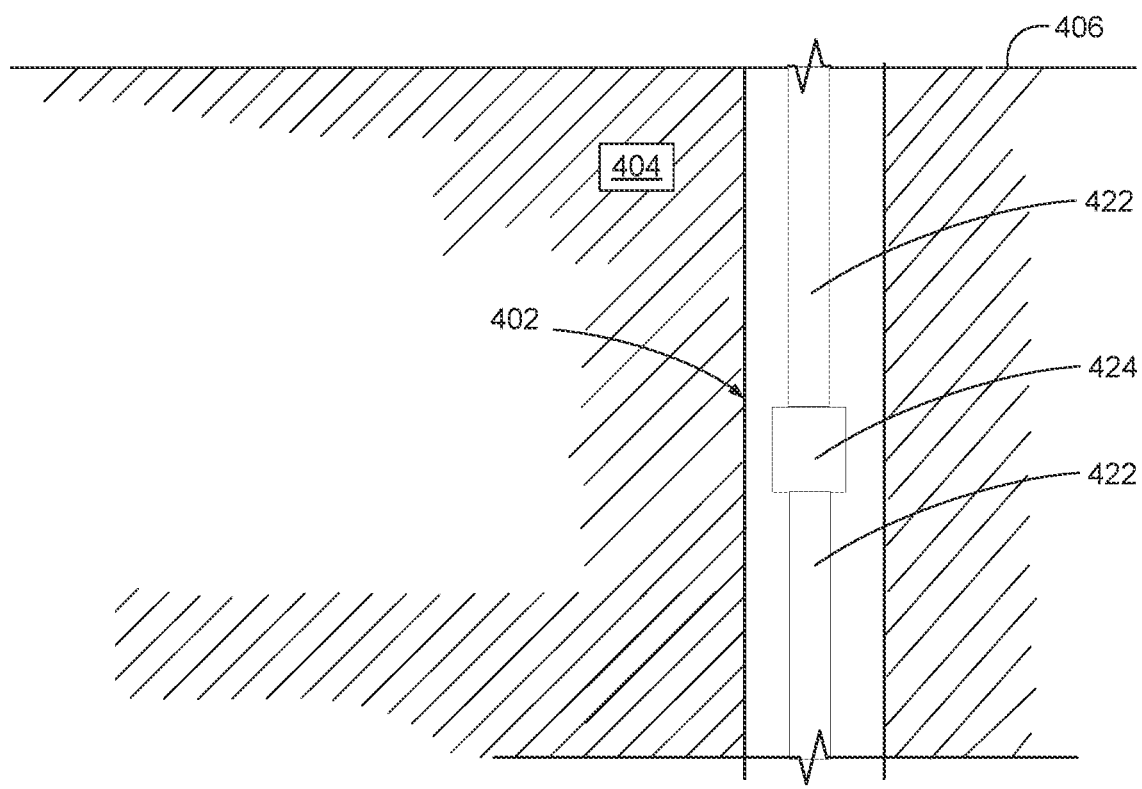

FIGS. 4A and 4B illustrate drilling of a geothermal borehole (e.g., a geothermal well) in accordance with some implementations. In FIG. 4A, an exemplary geothermal borehole 402 has been (e.g., is being) drilled through the earth 404 from the surface 406. While the geothermal borehole 402 in FIG. 4A is illustrated as a substantially vertical borehole, it might, in practice, have portions that are inclined or horizontally-oriented.

In some implementations, as illustrated in FIG. 4A, a drill rig comprising CT 408 is used for constructing the geothermal borehole 402. The CT 408 is tubing that is sufficiently flexible that long lengths can be coiled onto a spool and stored on a CT reel 412 that is mounted on a truck 414, so that it can be injected into a geothermal borehole 402 using a CT injector 410. In some implementations, the truck 414 is provided with a radio frequency (RF) power source or generator 416 and motorized equipment 418 of a type known in the art to rotate the reel 412.

In accordance with some implementations of the present disclosure, the CT reel 412 and/or the CT injector 410 are purposefully re-designed and re-sized for drilling geothermal boreholes with depths of about 1,000 to 2,000 feet. Current drilling technologies for geothermal and hydrocarbon well construction are divided between two categories: (A) small drilling rigs for shallow water or geothermal wells, usually drilling 100 to 400-feet long vertical wells, and (B) large drilling rigs for deep oil & gas and conventional geothermal wells, usually for 10,000 to 30,000 feet long wells. In oil and gas drilling and conventional geothermal drilling, no significant demand has historically existed for mid-range lengths, e.g., between 500 and 10,000 feet. Therefore, no off-the-shelf drilling rig has been developed for this range, leaving a technology gap between (A) and (B). While shallow water well drilling rigs (Category A) are small and portable enough to be transported and operated in high-density urban areas, they do not go very deep nor very fast. The deep oil and gas rigs (Category B) are fast and powerful, but also large and heavy, and are meant to operate in remote areas far from urban/suburban development. This leaves a gap for fast and strong, yet compact and portable drilling rigs that can operate in urban/suburban/rural areas.

In some implementations, as illustrated in FIG. 4B, a drill rig comprising one or more joint pipes 422 (e.g., joint drill pipes) are used for constructing the geothermal borehole 402. The joint pipes 422 are straight pipes having a fixed length (e.g., 10 feet long) and that are connected together via one or more tool joints 424 while drilling. For example, rigs for drilling geothermal wells for single-family residential applications (Category A) have joint pipes between 10 and 20 feet long.

Current drilling rigs (Categories A and B) use joint pipes. Drilling down, and then exiting the borehole on the way back up, must slow to a standstill when two joint pipes must be connected together. This repetitive process limits the average drilling speed to about 10-100 feet/hour for the entire well drilling operation. In contrast, with continuous CT drilling, however, the average drilling speeds can reach 150-200 feet/hour. These faster drilling speeds allow a significant reduction in time and operational costs: for instance, a 400-feet long geothermal well can be drilled in only 2 hours, instead of 20+ hours required by the shallow water well drilling rigs (Category A).

FIGS. 5A to 5D illustrate a drill bit 502 for generating geothermal boreholes according to some implementations.

Figure 5A:
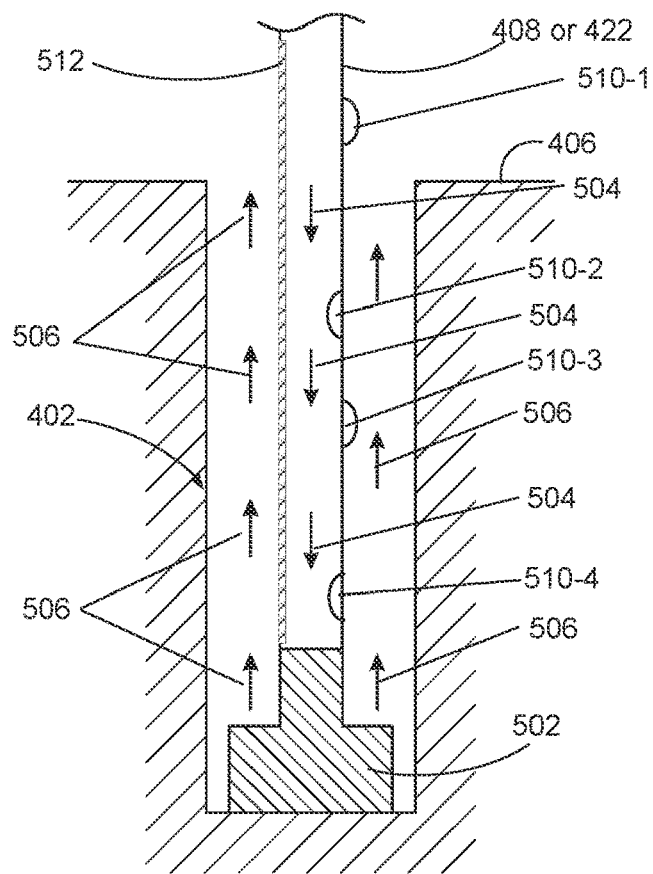
FIGS. 5A to 5D illustrate a drill bit 502 for generating geothermal boreholes according to some implementations.

FIG. 5A illustrates a cross-sectional view that shows a drill bit 502 mounted on one end of a CT 408 and/or a joint pipe 422, to facilitate drilling of the geothermal boreholes.

Figure 5B:
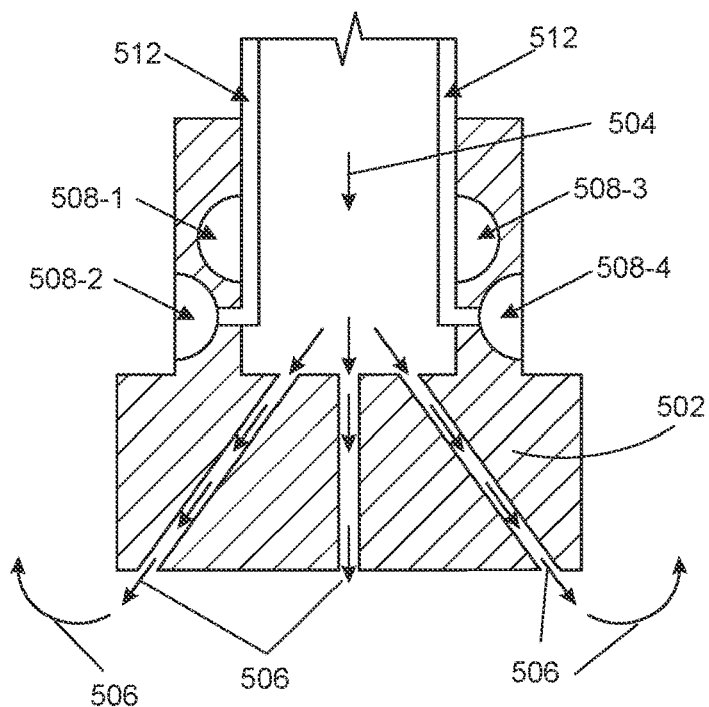

FIG. 5B illustrates a cross-sectional view of the drill bit 502 according to some implementations. The drill bit 502 is rotated by a motor (not shown) that is hydraulically activated by pumping drilling fluid (e.g., water and/or bentonite) through the CT 408 or the joint pipes 422. The arrows 504 in FIGS. 5A and 5B indicate the direction of the drilling fluid as it is pumped through the CT 408 and/or a joint pipe 422. The arrows 506 in FIGS. 5A and 5B indicate the direction of drilling mud (e.g., water and/or bentonite and debris) as it exits the drill bit 502 and motor.

In some implementations, the drill bit 502 includes sensors 508 (e.g., underground or downhole sensors) that are designed to measure underground parameters in-situ, as (e.g., during, while) the geothermal boreholes are being drilled/constructed. The underground parameters include temperature, pressure, humidity, lithology, azimuth, stresses, and/or depth correlation. In some implementations, the sensors 508 collect downhole data having data types that are illustrated in FIG. 6.

In some implementations, the sensors 508 are positioned on both an interior surface and an exterior surface of the drill bit 502. For example, FIG. 5B illustrates four downhole sensors 508-1 to 508-4. The sensors 508-1 and 508-3 are positioned on the interior surface of the drill bit 502. The sensors 508-2 and 508-4 are positioned on the exterior surface of the drill bit 502.

In some implementations, at least two of the sensors 508 have the same sensor type. As an example, the sensor 508-1 and the sensor 508-2 can both be temperature sensors. As another example, the sensor 508-1 and the sensor 508-3 can both be pressure sensors.

In some implementations, the sensors 508 include two sensors having the same sensor type. One of the two sensors is positioned on the interior surface and the other of the two sensors is positioned on the exterior surface. For example, in FIG. 5B, both the sensor 508-1 and the sensor 508-2 can be temperature sensors. The positioning of temperature sensors on both the interior and exterior surface of the drill bit 502 enables one to determine the temperature of the drilling fluid (e.g., drilling mud) before it enters the drill bit 502 after it exits the drill bit 502. By knowing these temperature values, one can calculate (e.g., determine) parameters such as frictional forces and heat generated by the frictional forces (e.g., by applying relations such as mass-momentum conservation energy in pipes).

In some implementations, the CT 408 and/or joint pipes 422 also includes one or more sensors 510 (e.g., surface sensors) that can be positioned along (e.g., between) the surface 406 and a depth of the geothermal borehole 402. In some implementations, the surface sensors 510 can be positioned on the surface 406, on the CT injector 410, on the reel 412, and/or anywhere on the truck 414. The surface sensors 510, such as the sensors 510-1 to 510-4 as shown in FIG. 5A, measure surface data in-situ, as the geothermal boreholes are being drilled/constructed. In some implementations, the sensors 510 measure (e.g., collect) data such as fluid rate, pressure, temperature, and/or a length of the CT or joint pipe running into the borehole. In some implementations, the sensors 510 collect surface data having data types that are illustrated in FIG. 6.

In some implementations, the sensors 510 are positioned on both an interior surface and an exterior surface along the CT 402/joint pipes 422.

In some implementations, at least two of the sensors 510 have the same sensor type.

In some implementations, the sensors 510 include two sensors having the same sensor type. One of the two sensors is positioned on the interior surface along the CT 402/joint pipes 422, and the other of the two sensors is positioned on the exterior surface along the CT 402/joint pipes 422.

FIG. 6 illustrates exemplary types of surface data and downhole data that are collected by the sensors 508 and the sensors 510 in accordance with some implementations.

With continued reference to FIG. 5, in some implementations, the underground data collected by the sensors 508 and/or the sensors 510 can be transferred to the surface (e.g., to the geothermal planning and optimization system 200) automatically and in real-time using telemetry wires 512. The telemetry wires 512 also transfer power from the surface to the sensors 508 and/or the sensors 510. In some implementations, the telemetry wires 512 are associated with telemetry technologies such as electrical conduits or mud pulse telemetry, both of which are used for oil and gas CT operations. The electrical conduits (e.g., wires) have the dual advantage of being capable of much higher data transmission rates and being capable to also power to the underground sensors 508 (and to the surface sensors 510) from the surface. In the case of mud pulse telemetry, the underground sensors 508 would need to be powered by batteries, making the drill bits much bigger.

Figure 5C:
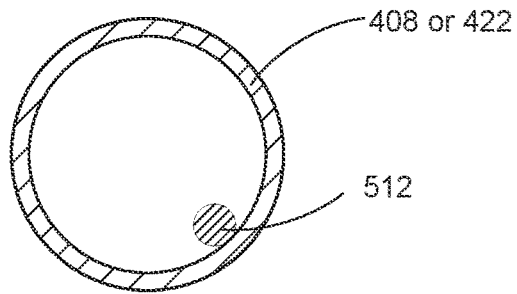

FIG. 5C is a cross-sectional view of a CT 408/joint pipe 422. In this example, the telemetry wire 512 is located on an internal wall (e.g., interior surface) of the CT 408/joint pipe 422.

Figure 5D:
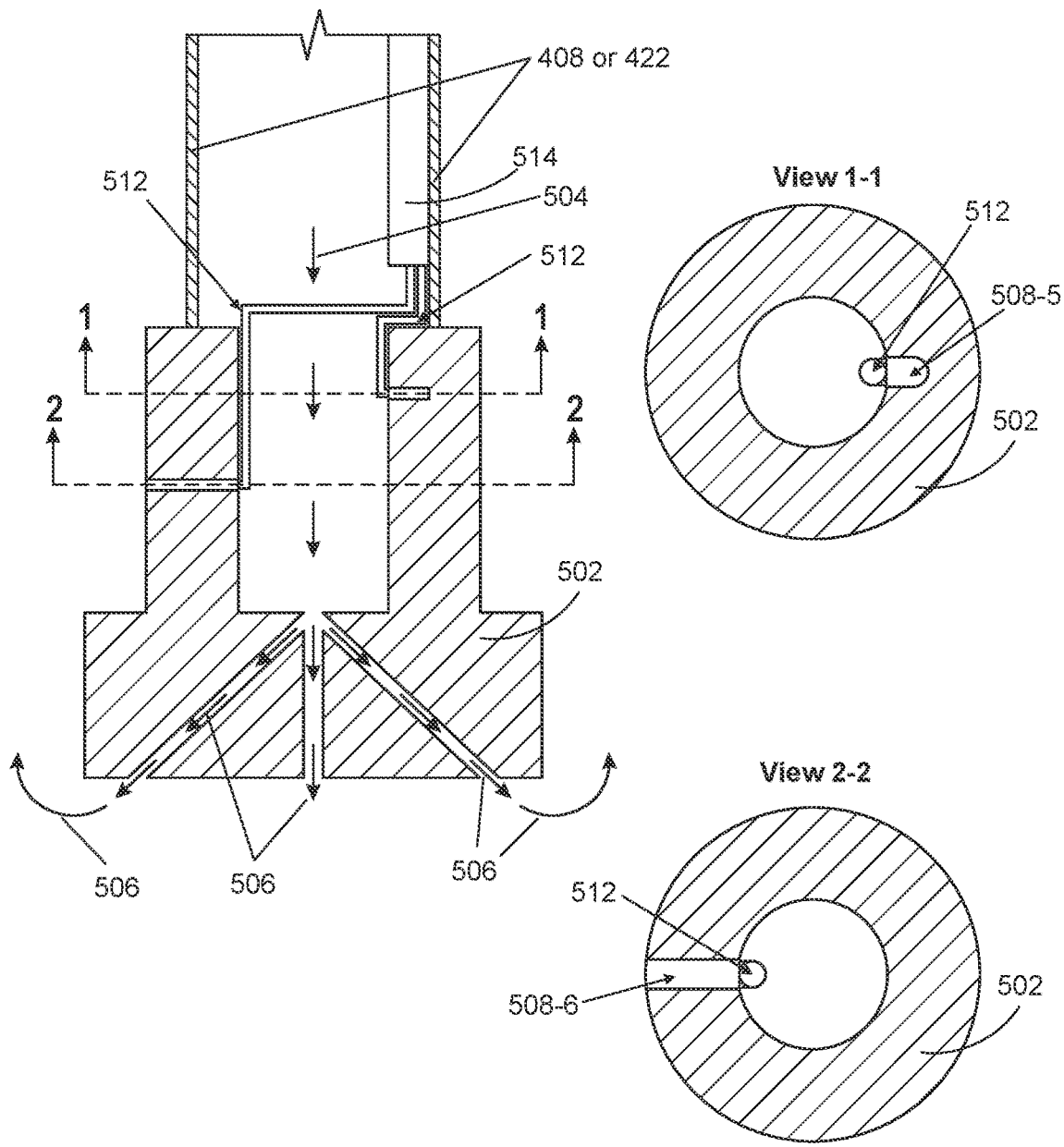

FIG. 5D is a cross-sectional view of the CT 408/joint pipe 422 and the drill bit 502, showing positions of the telemetry wire 512, a telemetry tube 514, and the flow directions 504 and 506 of the drilling fluid/drilling mud. The view in direction 1-1 shows the telemetry wire 512 positioned on an interior surface of the drill bit 502. The view in direction 1-1 also illustrates coupling (e.g., an electrical coupling, a communicative coupling) between the telemetry wire 512 and a sensor 508-5. In this example, the sensor 508-1 is an internal sensor (e.g., it is positioned on an interior surface of the drill bit 502). The view in direction 2-2 illustrates coupling (e.g., an electrical coupling, a communicative coupling) between the telemetry wire 512 and a sensor 508-6-5. In this example, the sensor 508-6 is an external sensor (e.g., it is positioned on an exterior surface of the drill bit 502).

Figure 7:
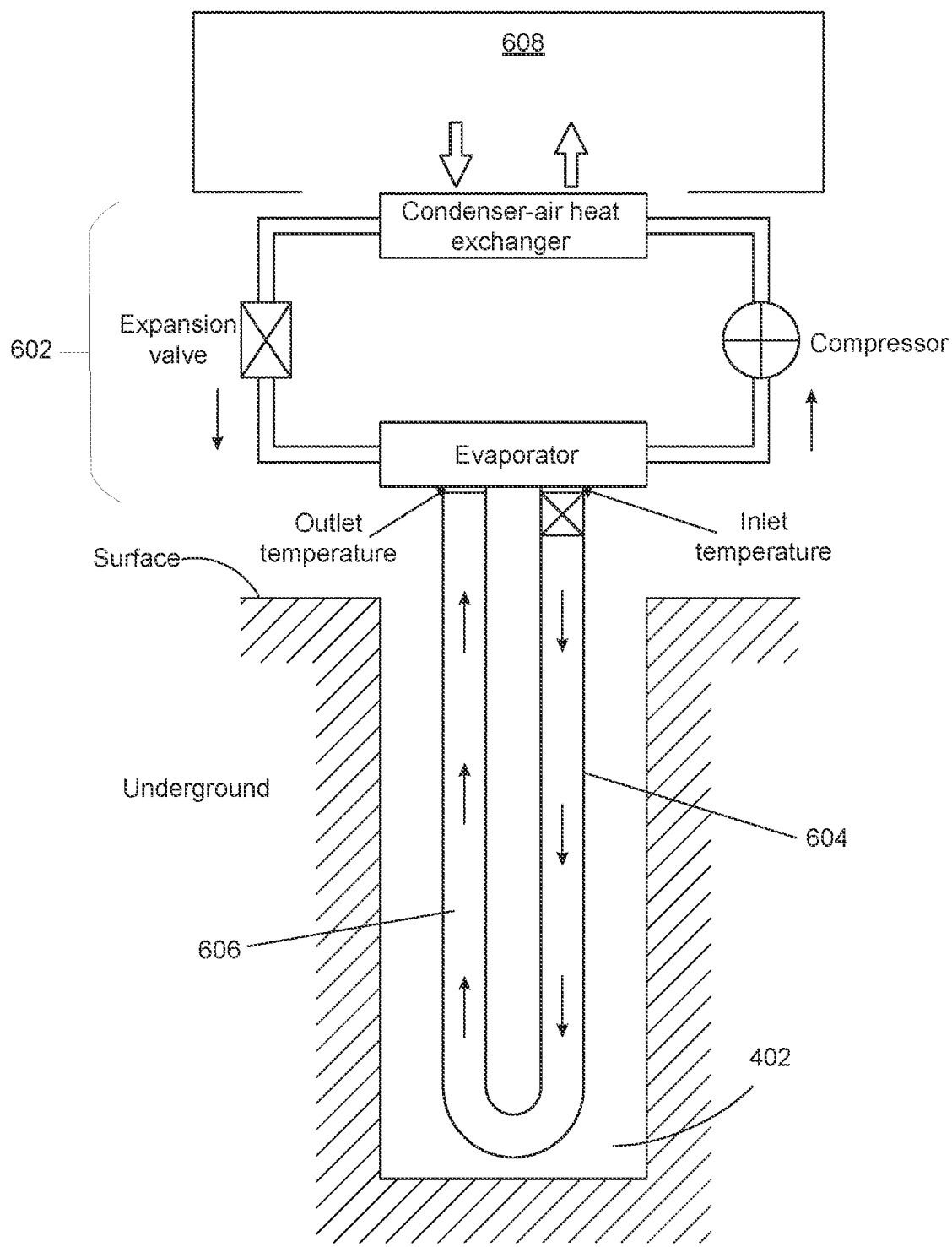
FIG. 7 illustrates a heat pump 602 and a geothermal loop 604 according to some implementations.

FIG. 7 illustrates a heat pump 602 and a geothermal loop 604 according to some implementations. In some implementations, the geothermal loop 604 is constructed from a geothermal borehole 402. The heat pump 602 uses the nearly constant temperature underground to heat or cool the interior of a building 608. The geothermal loop 604 is filled with a fluid 606 (e.g., a working fluid, such as a refrigerant) that circulates inside the geothermal loop 604. In summer, the surface air has a higher temperature compared to the underground temperature. The fluid 606 absorbs heat from the surface and releases it underground. In winter, the surface air has a lower temperature compared to the underground temperature. The fluid 606 absorbs heat from the underground and releases it to the surface. In some implementations, the heat pump 602 includes a reversing valve, which lets the heat pump 602 switch directions to either heat or cool the building.

Figure 8A:
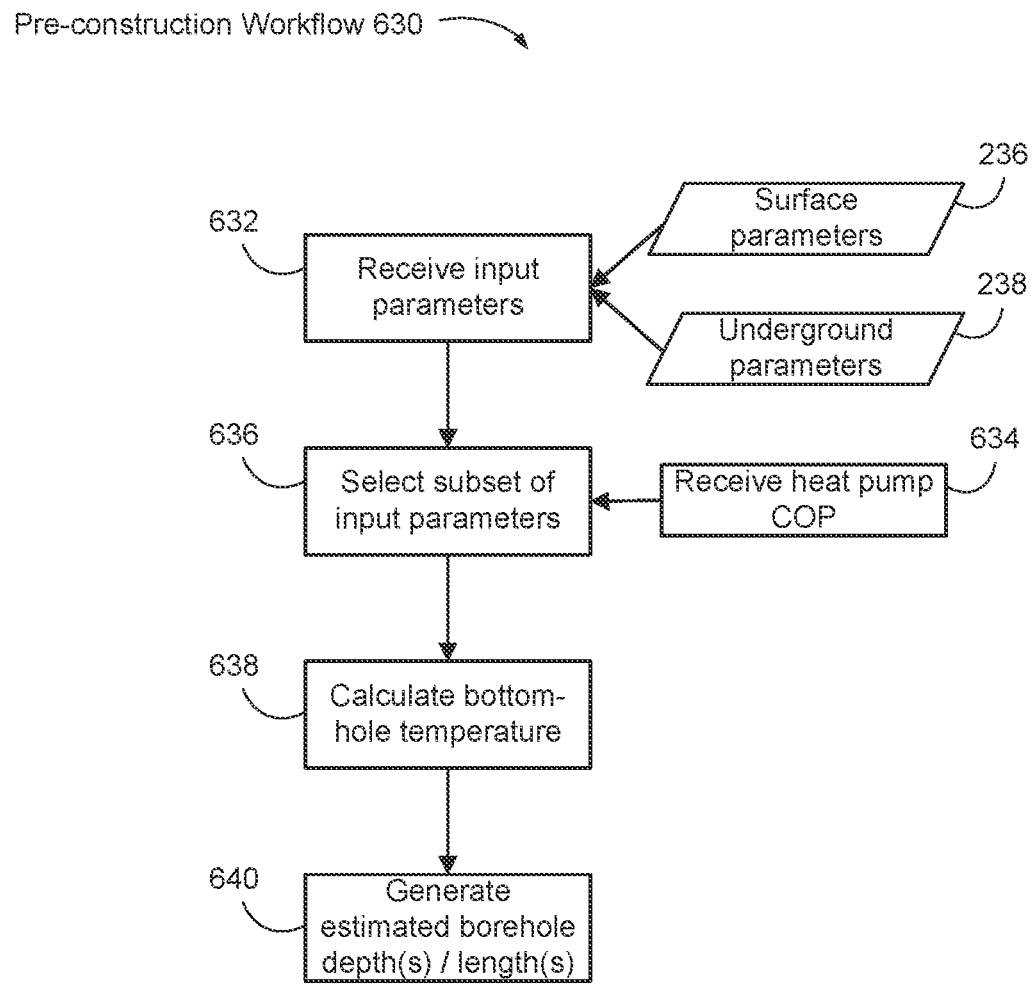
FIGS. 8A to 8C illustrate an integrated workflow for planning, constructing, and/or optimizing a GHCS operation, in accordance with some implementations.
Figure 8B:
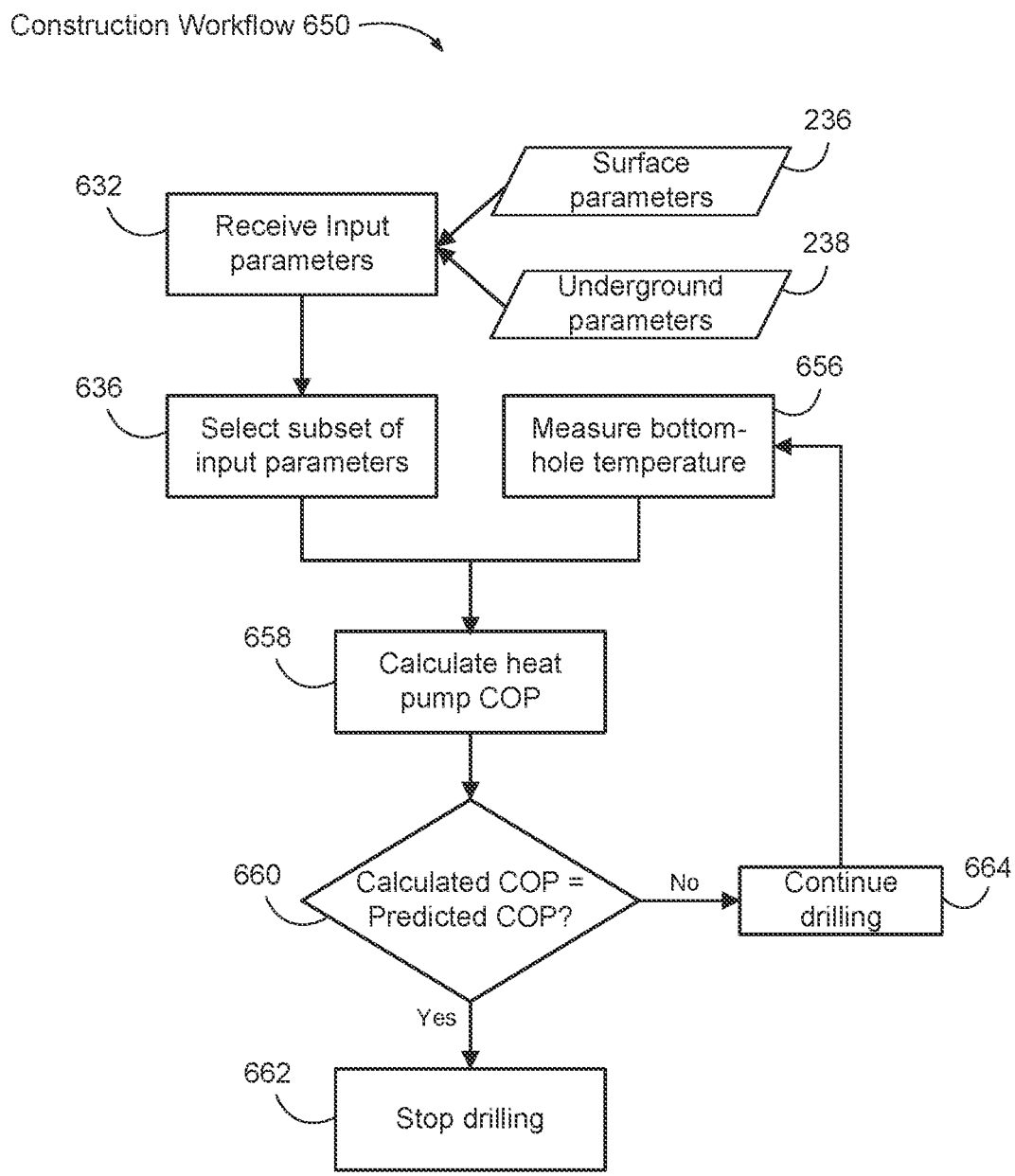
Figure 8C:
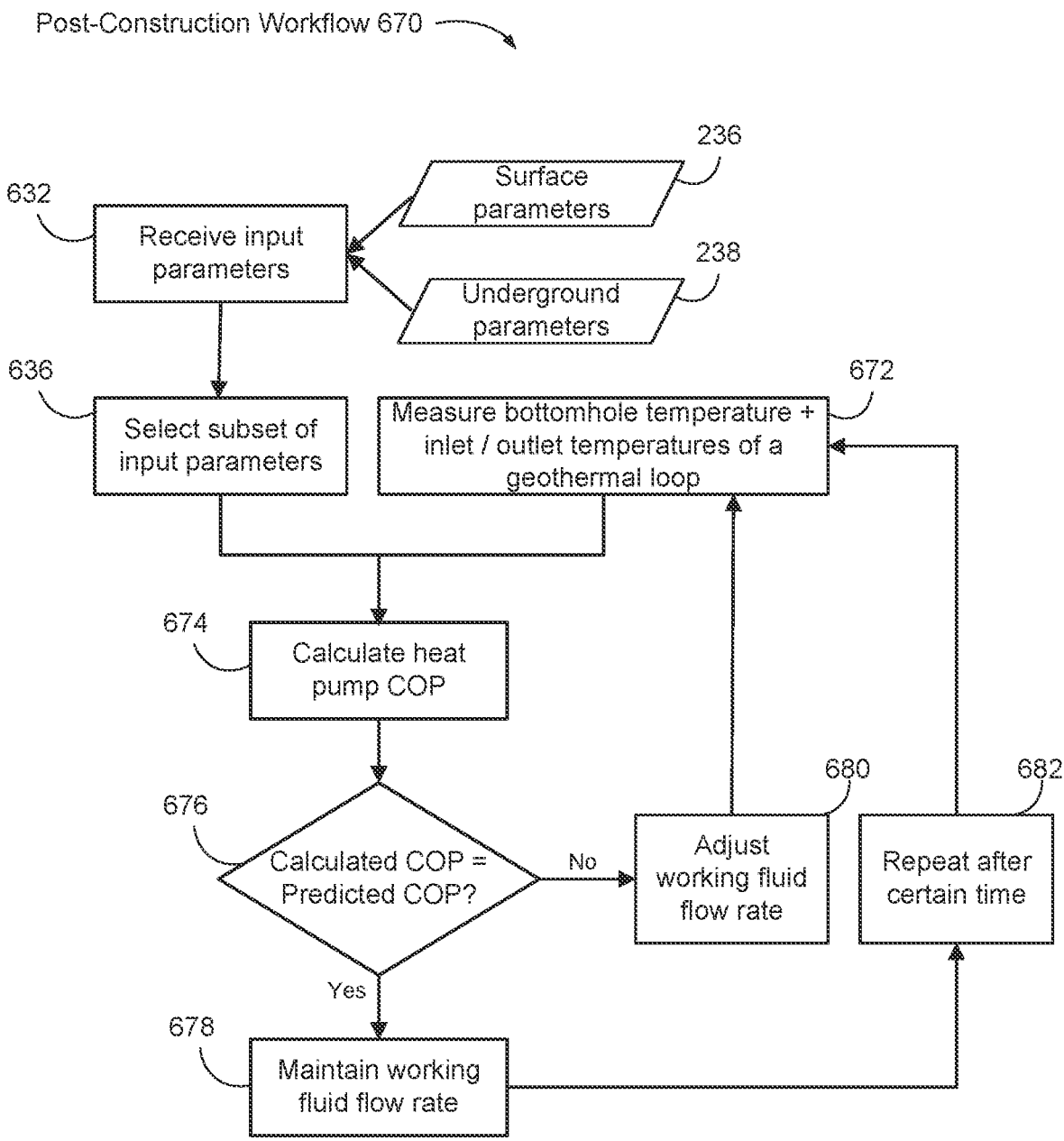
Figure 9A:
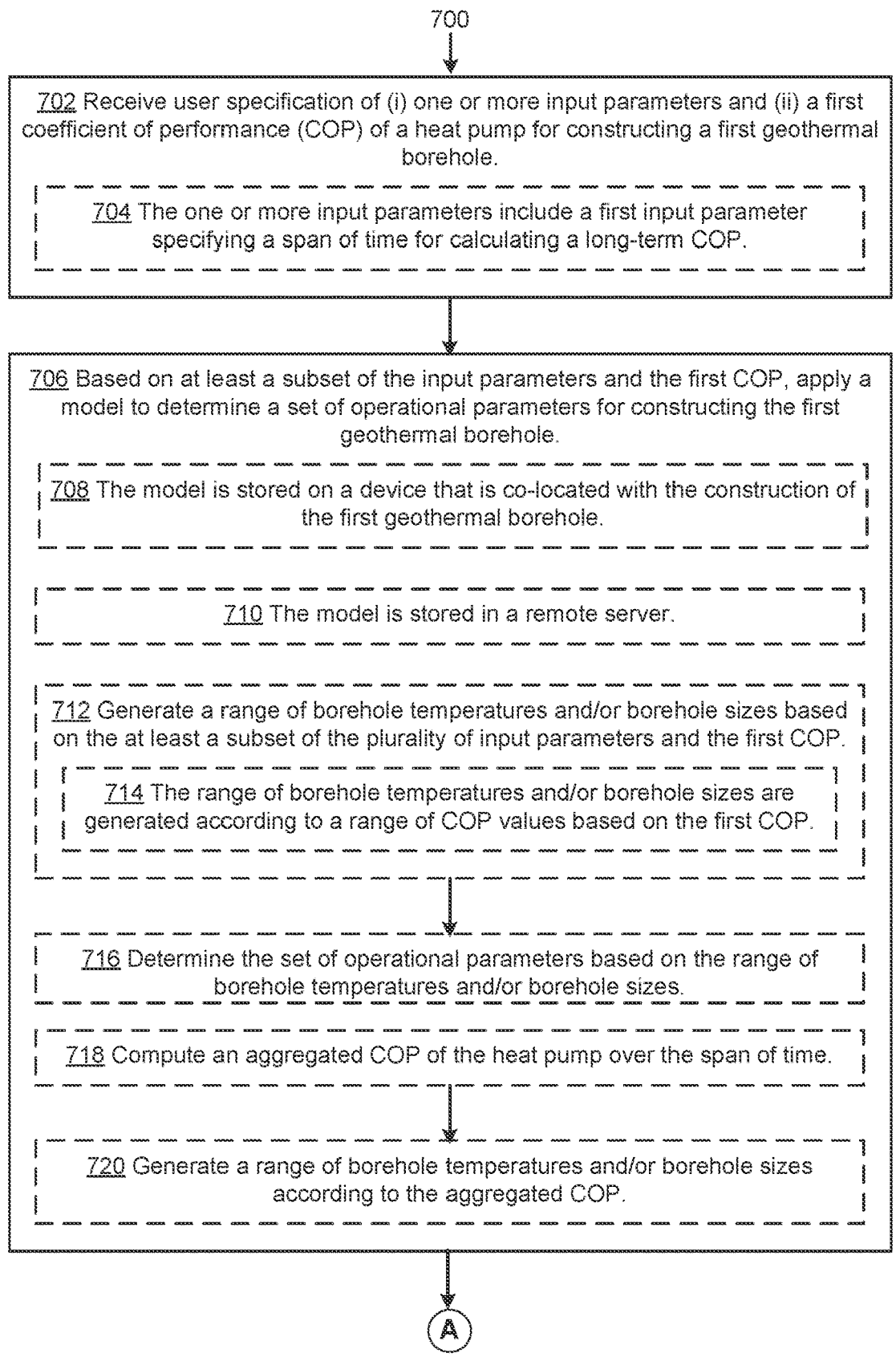
FIGS. 9A to 9D provide a flowchart of a method for optimizing a GHCS according to some implementations.
Figure 9B:
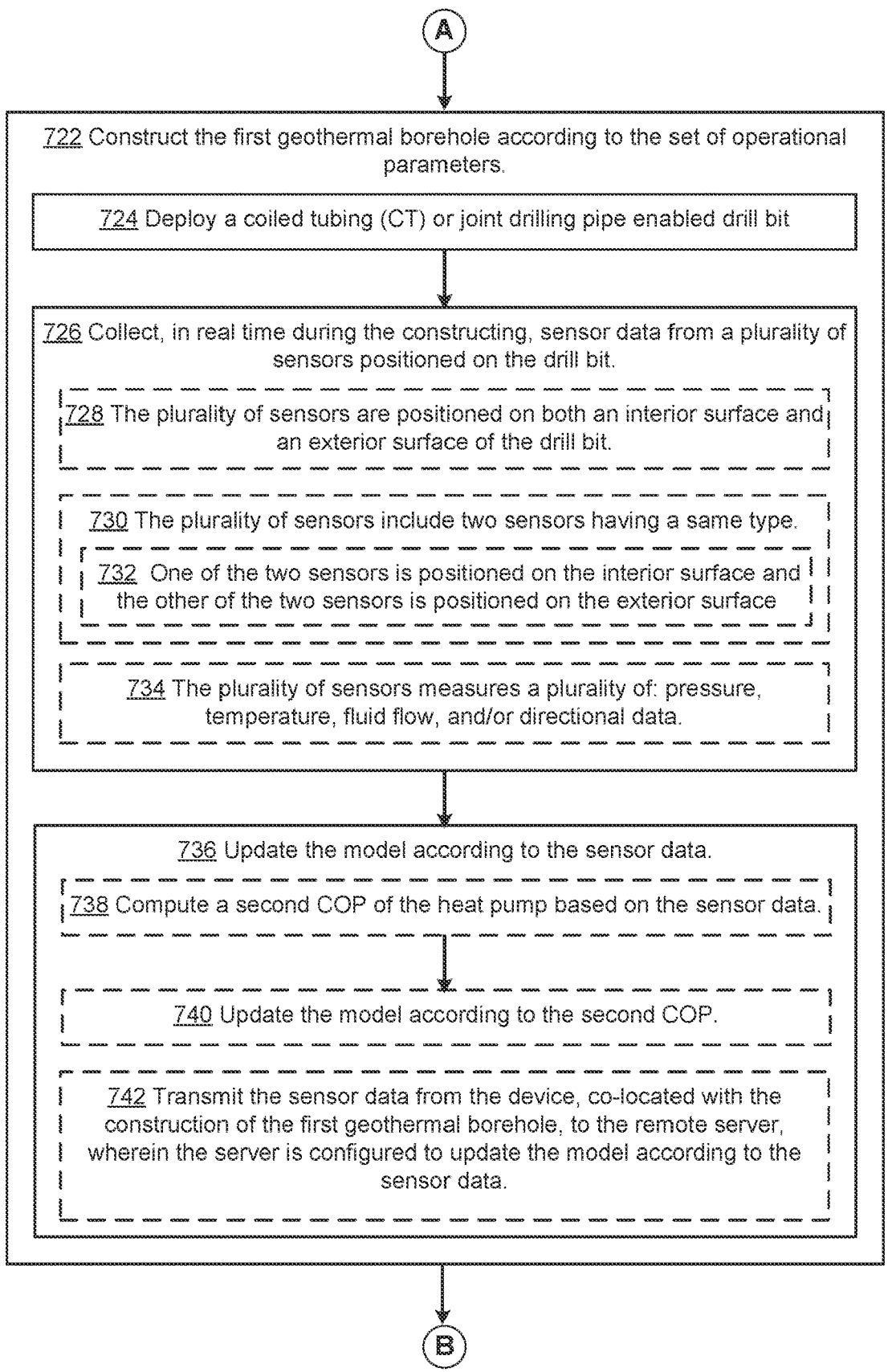
Figure 9C:
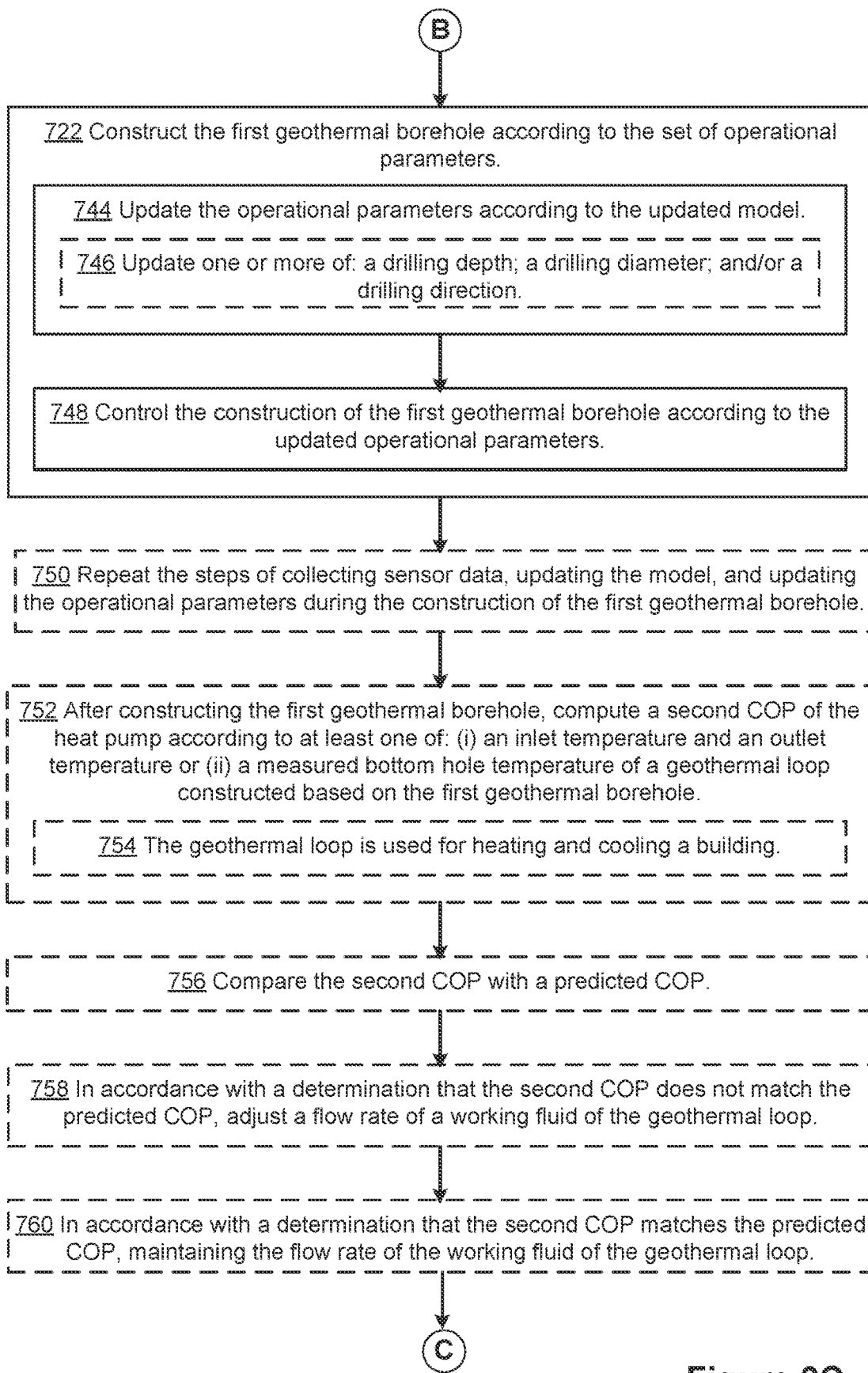
Figure 9D:
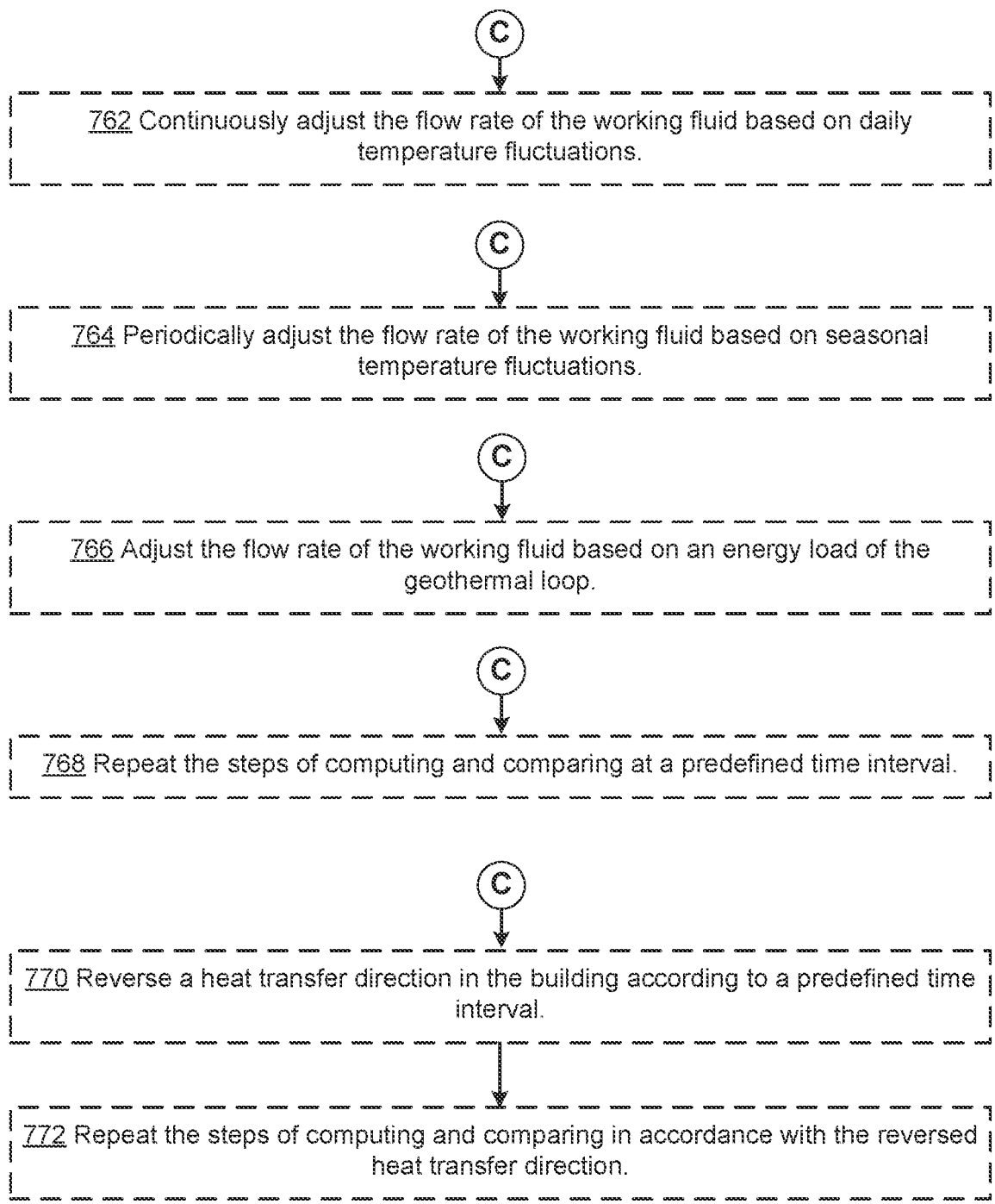

FIGS. 8A to 8C illustrate an integrated workflow (e.g., integrated workflow 628) for planning, constructing, and/or optimizing a GHCS operation, in accordance with some implementations. In some implementations, the workflow 628 includes a combination of one or more of: pre-construction workflow 630, a construction workflow 650, and a post-construction workflow 670. The workflows 630, 650, and 670 are executed by a processor (e.g., processor 202 or processor 302), in accordance with some implementations. In some implementations, each of the workflows 630, 650, and 670 can be executed as a standalone workflow.

FIG. 8A illustrates a pre-construction workflow 630 that is executed by a processor (e.g., processor 202 or processor 302) during a pre-construction phase of a GHCS operation, according to some implementations.

The workflow 630 includes receiving (632) input parameters (e.g., specified by a user, the system 200, or the server 120). The input parameters can include surface parameters 236 and/or underground parameters 238. In some implementations, the input parameters include default (e.g., predefined) values that can be modified and/or overridden by a user.

The workflow 630 includes receiving (634) (e.g., from a user) a heat pump COP. In some implementations, the heat pump COP comprises a manufacturing COP of the heat pump as specified by the pump manufacturer. In some implementations (e.g., for large buildings), two or more heat pumps that work in tandem or independently may be used. The workflow 630 includes receiving respective heat pump COPs corresponding to each of the two or more heat pumps.

The workflow 630 includes selecting (636) (e.g., by the processor), or receiving user selection of, a subset of input parameters. The workflow 630 includes calculating (638) a bottom-hole temperature of a geothermal borehole to be constructed, based on the selected subset of input parameters. The workflow 630 includes generating (640) (e.g., by the processor, by applying the model 126) estimated borehole parameters, such as a borehole depth, length, and/or diameter.

In some implementations, in accordance with receiving the heat pump COP in step 634, the processor generates a range of COP values (e.g., by applying the model 126), to obtain a range of borehole parameters, which in turn facilitates a builder to properly design and plan the drilling job, obtain the right drilling permits, and/or for plan the geothermal loops for an optimal long-term underground heat transfer process.

In some implementations, execution of the workflow 630 provides (e.g., generates) operational parameters of one geothermal borehole. In a construction that involves multiple boreholes, the workflow 630 is executed repeatedly, each of the iterations generating a set of borehole parameters for a respective borehole.

FIG. 8B illustrates a construction workflow 650 that is executed by a processor (e.g., processor 202 or processor 302) during a construction phase of a GHCS operation, according to some implementations. In some implementations, the workflow 650 includes the step 632 and the step 636 as described previously with respect to FIG. 8A.

In some implementations, the workflow 650 includes, in step 656, measuring (e.g., by one or more sensors) a bottom-hole temperature of a geothermal borehole during the construction of the borehole. For example, as illustrated in FIGS. 5B and 5D, sensors 508 can be mounted on a drill bit 502 that is used for drilling a geothermal borehole. In some implementations, the sensors 508 include temperature sensors for measuring (e.g., automatically and in real time) a bottom-hole temperature as the geothermal borehole is being drilled. In some implementations, the workflow 650 includes measuring surface and downhole conditions (e.g., pressure, temperature, and/or flow rate) during the construction of the borehole, from surface sensors (e.g., sensors 510) and underground sensors (e.g., sensors 508).

In some implementations, the workflow 650 includes, in step 658, calculating (e.g., by the processor) a heat pump COP based on the selected subset of input parameters and the measured bottom-hole temperature. For example, the processor updates the model 126 based on the measured bottom-hole temperature, and applies the updated model to determine a calculated (e.g., actual, modified) heat pump COP.

In some implementations, the workflow 650 includes comparing (660) the calculated COP with a predicted COP (e.g., predicted by the model 126 or a machine learning database 130). The workflow 650 includes, in step 662, terminating the drilling process when the calculated COP matches the predicted COP. The workflow 650 includes, in step 644, continuing the drilling of the geothermal borehole (e.g., drilling deeper, varying a drilling angle and/or a borehole diameter) when the calculated COP does not match the predicted COP.

Stated another way, the downhole sensors (e.g., sensors 508) encased in the drill bit 502 allows re-calibration of the model 126 in real time. That is, actual temperature data is acquired in real time during drilling, which changes the output of initial design model dynamically. This empowers the field personnel to optimize the operational parameters on-the-fly, e.g., drilling shorter, longer, or wider wells to ensure the optimal performance of each GHCS installation.

FIG. 8C illustrates a post-construction workflow 670 that is executed by a processor (e.g., processor 202 or processor 302) during a post-construction phase of a GHCS operation, according to some implementations. In some implementations, the workflow 670 includes the step 632 and the step 636 as described previously with respect to FIG. 8A.

In some implementations, the workflow 670 includes, in step 672, measuring a bottom-hole temperature (e.g., of a borehole or a geothermal loop) and an inlet/outlet temperature of a geothermal loop (e.g., geothermal loop 604). In some implementations, after the geothermal borehole 402 has been constructed, an optical fiber can be placed inside the constructed borehole, for collecting the temperature along a geothermal loop constructed based on the borehole. In some implementations, the bottom-hole temperature is determined indirectly via calculations (e.g., solving a loop-pipe flow thermodynamic equation, or determining a temperature profile along the geothermal loop loop).

In some implementations, the workflow 670 includes, in step 674, calculating a heat pump COP. The workflow 670 includes. in step 676, comparing the calculated COP with a predicted COP (e.g., predicted by the model 126). The workflow 670 includes, in step 678, maintaining a current flow rate of a working fluid in the geothermal loop when the calculated COP matches the predicted COP. The workflow 670 includes, in step 680, adjusting the flow rate of the working fluid in the geothermal loop when the calculated COP does not match the predicted COP.

In some implementations, the workflow 670 includes, in step 682, repeating the measuring and calculating (e.g., steps 672, 674, and 676) after a certain time (e.g., every month, every three months, every year, every change of season), and to maintain or adjust the flow rate of the working fluid accordingly.

In a geothermal system, heat exchange occurs (1) between the geothermal loop and the building and (2) between the geothermal loop and the near constant-temperature thermal reservoir from the underground rocks. The underground heat transfer process between the working fluid 606 and the underground rocks (e.g., the underground region surrounding the geothermal loop) can be calculated by solving a radial (i.e., one-dimensional) diffusion equation in the near-borehole region (e.g., 10 to 30 feet radially from the borehole). The initial temperature of the near-borehole region is different from the long-term pseudo-steady-state temperature of the same region. The temperature of the near-borehole region changes over time due to several reasons. First, for heating, the working fluid picks up heat from the underground rocks and brings it to the surface, so the inlet temperature of the geothermal loop (see, e.g., FIG. 7) is lower than the outlet temperature of the geothermal loop. If the fluid is continuously circulated, heat is produced from the underground, so the temperature in the near-borehole region decreases over time until it reaches a pseudo-steady-state temperature, which is lower than the initial underground temperature. On the other hand, for cooling, the working fluid loses heat to the underground rocks, so the inlet temperature of the geothermal loop is higher than the outlet temperature of the geothermal loop. If the fluid is continuously circulated, heat is lost to the underground, so the temperature in the near-borehole region increases over time until it reaches a pseudo-steady-state temperature, which is higher than the initial underground temperature. Stated another way, because the pseudo-steady-state temperature of the near-borehole region is expected to vary from an initial temperature when the geothermal loop is first installed, the working fluid flow rate may need to be adjusted over time to ensure optimal long-term performance of the GHCS.

FIGS. 9A to 9D provide a flowchart of a method 700. The method 700 is also called a process. The method 700 is performed at a geothermal planning and optimization system 200 (e.g., a computing device, a computer system) that has one or more processors 202 and memory 206. The memory 206 stores one or more programs configured for execution by the one or more processors 202. In some implementations, the operations shown in FIGS. 1, 4A, 4B, 5A to 5D, 6, 7, and 8A to 8C correspond to instructions stored in the memory 206 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 700 may be combined and/or the order of some operations may be changed.

The system 200 receives (702) user specification of (i) one or more (e.g., a plurality of) input parameters (e.g., input parameters 234) and (ii) a first coefficient of performance (COP) (or energy efficiency ratio (EER)) of a heat pump for constructing a first geothermal borehole (e.g., geothermal borehole 402, a borehole heat exchanger). In some implementations (e.g., for large buildings), a GHCS system may include two or more heat pumps that work independently on or in tandem. The system 200 may receive user specification of respective COPs for the two or more heat pumps.

The COP measures the efficiency of a heating, ventilating, and air conditioning (HVAC) pump (e.g., heat pump) that is used for heating. The EER measures the efficiency of an HVAC pump that is used for cooling. As used herein, "COP" is used here to denote heating and/or cooling operations. The implementations disclosed herein apply to both COP (e.g., heating) and EER (e.g., cooling).

In some implementations, the plurality of input parameters includes surface input parameters (e.g., surface parameters 236). The surface input parameters can include parameters for: building size, building type (e.g., wall material and insulation of the building, roof type, the number of windows in the building, window size(s), window orientation(s) (e.g., whether the windows face the sun)), energy load of the building, the HVAC system used, the location of the building, heat pump size, heat pump type, thermal efficiency of the heat pump, inlet and outlet temperatures of geothermal loop(s) associated with the building, an outdoor temperature, and/daily and seasonal temperature ranges.

In some implementations, the plurality of input parameters includes underground parameters (e.g., underground parameters 238). The underground input parameters can include parameters for: fluid type (e.g., fluid density and/or viscosity), geothermal pipe roughness, inlet temperatures of the geothermal loop(s), length (e.g., depth) of the geothermal loop, a size (e.g., diameter) of the geothermal loop, a trajectory of the geothermal loop (e.g., whether the geothermal loop is vertical, horizontal, deviated, or inclined), geothermal loop material and/or their heat transfer coefficient(s), underground pressure, temperature, rock type, aquifer depth and height, grout/cement/casing heat transfer coefficients, and/or geothermal working fluid flow rate.

In some implementations, the one or more input parameters include (704) a first input parameter specifying a span of time (e.g., 1 year, 5 years, 10 years) for calculating a long-term COP. For example, as explained with respect to FIG. 8C, the pseudo-steady-state temperature of a near-borehole region of a geothermal loop is likely different from its initial temperature, when the geothermal loop is first installed, because of heat exchange between both the geothermal loop and the building and the geothermal loop and the near constant-temperature thermal reservoir from the underground rocks.

The system 200 applies (706) a model (e.g., model 126) based on at least a subset of the input parameters and the first COP, to determine (e.g., calculate, output, predict) a set of operational parameters for constructing (e.g., drilling) the first geothermal borehole.

In some implementations, the subset of the input parameters can be selected by the user, or by the system 200, or a combination thereof.

In some implementations, the set of operational parameters can include a borehole size, a borehole depth (and temperature), a borehole length, and/or an angle (inclination) of the borehole.

In some implementations, the system 200 is co-located with the first geothermal borehole construction operation. The model is stored (708) locally on the system 200.

In some implementations, the model is stored (710) on a remote server (e.g., server system 120). For example, in some implementations, at least a subset of the modeling and/or analytics can be performed remotely by the server system 120 (e.g., remote from the GHCS construction and operation sites). In some implementations, the modeling and/or analytics can be performed simultaneously (e.g., in parallel) by a plurality of systems 200 and/or the server system 120.

In some implementations, applying the model to determine the set of operational parameters includes generating (712) (e.g., predicting) (e.g., by the one or more processors 202) a range of borehole temperatures and/or borehole sizes (e.g., borehole lengths, depths, and/or diameters) based on the at least a subset of the plurality of input parameters and the first COP.

In some implementations, the range of borehole temperatures and/or borehole sizes are generated according to (714) a range of COP values based on (e.g., that includes) the first COP.

For example, as discussed with respect FIG. 8A, in some implementations, in accordance with receiving the heat pump COP in step 634, the system 200 can generate a range of COP values (e.g., by applying the model 126) to obtain a range of borehole parameters, which facilitate proper design and planning of the drilling job, getting the right drilling permits, and/or for planning the geothermal loops for an optimal long-term underground heat transfer process.

In some implementations, the system 200 determines (716) the set of operational parameters based on the range of borehole temperatures and/or borehole sizes.

In some implementations, applying the model to determine the set of operational parameters includes computing (718) an aggregated COP (e.g., a long-term COP) of the heat pump over the span of time and generating (720) (e.g., predicting) a range of borehole temperatures and/or borehole sizes according to the aggregated COP.

The system 200 constructs (722) (or causes construction of) the first geothermal borehole according to the set of operational parameters.

In some implementations, the system 200 deploys (724) a CT or joint drill pipe enabled drill bit. For example, as illustrated in FIGS. 4 and 5, in some implementations, the system 200 deploys a drill bit 502 that is mounted on one end of a CT 408 or mounted on one end of a joint pipe 422, for performing a geothermal well drilling operation using the CT or joint drill pipes. The well drilling operation creates an underground borehole (e.g., from scratch), or enlarges and/or extends an existing borehole.

The system 200 collects (726) (e.g., measures), in real time during the constructing (e.g., automatically, and without user intervention), sensor data (e.g., sensor data 244, downhole conditions) from a plurality of sensors (e.g., sensors 508) positioned on the drill bit (e.g., drill bit 508), while the CT operation and/or drilling operation using joint drill pipes or CT is being performed. In some implementations, the system 200 collects sensor data (e.g., downhole data and surface data, such as pressure, temperature, and/or flow rate) from both the undergrounds sensors 508 and the surface sensors 510 when drilling. In some implementations, the system measures the CT/joint drill pipe length in hole when drilling, as a raw estimate of the borehole depth. In some circumstances, the CT is not straight in hole and can buckle if pushed too hard, but this can be modeled using solid mechanics/tensile force analysis.

In some implementations, the plurality of sensors are positioned (728) on both an interior surface and an exterior surface of the drill bit. This is illustrated in FIGS. 5A, 5B, and 5D. For example, in some implementations, the sensors are positioned such that they contact the drill cutting fluid on both the interior and exterior surfaces of the drill bit 502, thereby enabling the system to determine the temperature of the drilling fluid (before it enters the drill bit 502 after it exits the drill bit 502, and to determine (e.g., calculate) drilling parameters such as frictional forces and heat generated by the frictional forces (In some implementations, the plurality of sensors include (730) two sensors having a same type (e.g., two temperature sensors, two pressure sensors, etc.). One of the two sensors is (732) positioned on the interior surface and the other of the two sensors is positioned on the exterior surface. This is illustrated in FIG. 5B.

In some implementations, the plurality of sensors measures (734) a plurality of: pressure, temperature, fluid flow, and/or directional data (e.g., inclination or azimuth). For example, FIG. 6 illustrates the exemplary types of data that are measured (e.g., collected) by the sensors.

The system 200 updates (736) (e.g., in real time, automatically, and without user intervention) the model according to the sensor data.

In some implementations, updating the model according to the sensor data includes computing (738) a second COP (e.g., an updated COP) of the heat pump based on the sensor data and/or based on the at least a subset of the plurality of parameters), and updating (740) the model according to the second COP.

For example, as illustrated in steps 656, 658, 660, 662, and 664 in FIG. 8B, the system 200 computes a heat pump COP (step 658 in FIG. 8B) based on the bottom-hole temperature measured by the sensors 508 and/or the sensors 510, and updates the model 126 (e.g., whether to continue drilling or to stop drilling) according to the computed heat pump COP.

In some implementations, the model 126 is stored on the remote server (e.g., server system 120). Updating the model according to the sensor data includes transmitting (742) the sensor data from the system 200 to the server, wherein the server is configured to: update the model according to the sensor data.

The system 200 updates (744) the operational parameters according to the updated model.

In some implementations, updating the operational parameters includes updating (746) one or more of: a drilling depth, a drilling diameter, and/or a drilling direction.

The system 200 controls (748) (e.g., modifies or adjusts operational parameters) (e.g., in real time) the construction of the first geothermal borehole according to the updated operational parameters. Stated another way, in contrast to existing geothermal wells that are constructed using predetermined dimensions (e.g., lengths and/or depths that are pre-determined), the actual dimensions of the first geothermal borehole may vary from its initial dimensions, depending on the underground conditions that are determined as the drilling/construction operation is carried out.

In some implementations, the system 200 repeats (750) the steps of collecting, updating, and controlling during the construction of the first geothermal borehole.

In some implementations, after the first geothermal borehole is constructed, the system 200 computes (752) a second COP of the heat pump according to at least one of: (i) an inlet temperature and an outlet temperature or (ii) a bottom hole temperature of a geothermal loop constructed based on the first borehole.

In some implementations, the bottom hole temperature is measured directly. For example, a sensor (e.g., a single point sensor) can be placed inside the first geothermal borehole for measuring the bottom hole temperature. In some implementations, during or after construction of the first geothermal borehole, an optical fiber can be placed inside the first geothermal borehole for collecting the temperature along the geothermal loop constructed based on the first borehole. In some implementations, the bottom hole temperature is determined indirectly via calculations (e.g., solving a loop-pipe flow thermodynamic equation, or determining a temperature profile along the geothermal loop).

In some implementations, the system 200 compares (756) the second COP with a predicted COP (e.g., the first COP, or a COP value that is calculated during first borehole construction).

In some implementations, in accordance with a determination that the second COP does not match the predicted COP, the system 200 adjusts (758) a flow rate of a working fluid of the geothermal loop; and In some implementations, in accordance with a determination that the second COP matches the predicted COP, the system 200 maintains (760) the flow rate of the working fluid of the geothermal loop.

In some implementations, the GHCS operation includes constructing multiple boreholes. The method 700 comprises constructing the first borehole and computing the second COP of the heat pump after constructing the first geothermal borehole, prior to commencing construction of a second borehole. In some implementations, constructing the second borehole comprises repeating the steps for constructing the first borehole. In some implementations, the operational parameters for constructing the second borehole take into consideration the second COP of the first borehole.

In some implementations, the system 200 continuously adjusts (762) (e.g., once every hour, once every three hours, etc.) the flow rate of the working fluid based on daily temperature fluctuations.

In some implementations, the system 200 periodically adjusts (764) (e.g., once per month, once every three months, etc.) the flow rate of the working fluid based on seasonal temperature fluctuations.

In some implementations, the system 200 adjusts (766) the flow rate of the working fluid based on an energy load of the geothermal loop.

In some implementations, the system 200 repeats (768) the steps of computing and comparing at a predefined time interval.

In some implementations, the method 700 further comprises reversing (770) (e.g., changing, switching) a heat transfer direction (e.g., ground to building, or building to ground) in the building according to a predefined time interval (e.g., change in season, month of the year). The system 200 repeats (772) the steps of computing and comparing in accordance with the reversed heat transfer direction (so as to ensure optimal COP during the flow direction reversal).

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or implementations.

As used herein, the term "and/or" encompasses any combination of listed elements. For example, "A, B, and/or C" includes the following sets of elements: A only, B only, C only, A and B without C, A and C without B, B and C without A, and a combination of all three elements, A, B, and C.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for optimizing geothermal heating and cooling system (GHCS) operation, comprising:
    receiving user specification of (i) one or more input parameters and (ii) a first coefficient of performance (COP) of a heat pump for constructing a first geothermal borehole;
    based on at least a subset of the input parameters and the first COP, applying a model to determine a set of operational parameters for constructing the first geothermal borehole;
    constructing the first geothermal borehole according to the set of operational parameters, including:
        deploying a coiled tubing (CT) or joint drill pipe enabled drill bit;
        collecting, in real time during the constructing, sensor data from a plurality of sensors positioned on the drill bit;
        updating the model according to the sensor data;
        updating the operational parameters according to the updated model; and
        controlling the construction of the first geothermal borehole according to the updated operational parameters.

2. The method of claim 1, wherein updating the model according to the sensor data includes:
    computing a second COP of the heat pump based on the sensor data; and
    updating the model according to the second COP.

3. The method of claim 1, wherein updating the operational parameters includes updating one or more of:
    a drilling depth;
    a drilling diameter; and/or
    a drilling direction.

4. The method of claim 1, wherein the plurality of sensors are positioned on both an interior surface and an exterior surface of the drill bit.

5. The method of claim 4, wherein the plurality of sensors include two sensors having a same type, wherein one of the two sensors is positioned on the interior surface and the other of the two sensors is positioned on the exterior surface.

6. The method of claim 1, wherein the plurality of sensors measures a plurality of: pressure, temperature, fluid flow, and/or directional data.

7. The method of claim 1, wherein applying the model to determine the set of operational parameters includes:
generating a range of borehole temperatures and/or borehole sizes based on the at least a subset of the plurality of input parameters and the first COP; and
determining the set of operational parameters based on the range of borehole temperatures and/or borehole sizes.

8. The method of claim 7, wherein the range of borehole temperatures and/or borehole sizes are generated according to a range of COP values based on the first COP.

9. The method of claim 1, wherein:
the one or more input parameters include a first input parameter specifying a span of time for calculating a long-term COP; and
applying the model to determine the set of operational parameters includes:
computing an aggregated COP of the heat pump over the span of time; and
generating a range of borehole temperatures and/or borehole sizes according to the aggregated COP.

10. The method of claim 1, further comprising:
repeating the steps of collecting sensor data, updating the model, and updating the operational parameters during the construction of the first geothermal borehole.

11. The method of claim 1, wherein the model is stored locally on a computing device that is co-located with the construction of the first geothermal borehole.

12. The method of claim 1, wherein:
the model is stored on a remote server; and
updating the model according to the sensor data includes transmitting the sensor data from a computing device that is co-located with the construction of the first geothermal borehole to the remote server, wherein the server is configured to update the model according to the sensor data.

13. The method of claim 1, further comprising:
after constructing the first geothermal borehole:
computing a second COP of the heat pump according to at least one of: (i) an inlet temperature and an outlet temperature or (ii) a measured bottom hole temperature of a geothermal loop constructed based on the first geothermal borehole;
comparing the second COP with a predicted COP;
in accordance with a determination that the second COP does not match the predicted COP, adjusting a flow rate of a working fluid of the geothermal loop; and
in accordance with a determination that the second COP matches the predicted COP, maintaining the flow rate of the working fluid of the geothermal loop.

14. The method of claim 13, further comprising:
continuously adjusting the flow rate of the working fluid based on daily temperature fluctuations.

15. The method of claim 13, further comprising:
periodically adjusting the flow rate of the working fluid based on seasonal temperature fluctuations.

16. The method of claim 13, further comprising:
adjusting the flow rate of the working fluid based on an energy load of the geothermal loop.

17. The method of claim 13, further comprising:
repeating the steps of computing and comparing at a predefined time interval.

18. The method of claim 13, wherein the geothermal loop is used for heating and cooling a building, the method further comprising:
reversing a heat transfer direction in the building according to a predefined time interval; and
repeating the steps of computing and comparing in accordance with the reversed heat transfer direction.

19. A system for optimizing a geothermal heating and cooling system (GHCS) operation, comprising:
a drilling rig configured to:
construct a first geothermal borehole according to a set of operational parameters; and
deploy a coiled tubing (CT) or joint drill pipes enabled drill bit; and
a processor configured to:
receive user specification of (i) one or input parameters and (ii) a first coefficient of performance (COP) of a heat pump for constructing the first geothermal borehole;
based on at least a subset of the input parameters and the first COP, apply a model to determine the set of operational parameters for constructing the first geothermal borehole;
collect, in real time during the construction, sensor data from a plurality of sensors positioned on the drill bit;
update the model according to the sensor data;
update the operational parameters according to the updated model; and
control the construction of the first geothermal borehole according to the updated operational parameters.

20. A non-transitory computer readable storage medium storing one or more programs configured for execution by a computing device having one or more processors, and memory, the one or more programs comprising instructions for:
receiving user specification of (i) one or more input parameters and (ii) a first coefficient of performance (COP) of a heat pump for constructing a first geothermal borehole;
based on at least a subset of the input parameters and the first COP, applying a model to determine a set of operational parameters for constructing the first geothermal borehole;
constructing the first geothermal borehole according to the set of operational parameters, including:
deploying a coiled tubing (CT) or joint drill pipe enabled drill bit;
collecting, in real time during the constructing, sensor data from a plurality of sensors positioned on the drill bit;
updating the model according to the sensor data;
updating the operational parameters according to the updated model; and
controlling the construction of the first geothermal borehole according to the updated operational parameters.

* * * * *